United States Patent [19]

Schlie et al.

[11] Patent Number: 5,425,044
[45] Date of Patent: Jun. 13, 1995

[54] COMPACT, BURST MODE, PULSED, HIGH ENERGY, BLOWDOWN FLOW PHOTOLYTIC ATOMIC IODINE LASER

[75] Inventors: LaVerne A. Schlie; David P. Dimiduk; Bruce S. Masson, all of Albuquerque, N. Mex.

[73] Assignee: The United States of America as represented by the Secretary of the Air Force, Washington, D.C.

[21] Appl. No.: 282,842

[22] Filed: Jul. 22, 1994

[51] Int. Cl.⁶ .......................... H01S 3/22; H01S 3/223
[52] U.S. Cl. .......................................... 372/55; 372/70
[58] Field of Search ...................... 372/55, 59, 60, 70, 372/89, 90

[56] References Cited

U.S. PATENT DOCUMENTS

| | | | |
|---|---|---|---|
| 4,068,196 | 1/1978 | Hohla et al. | 331/94.5 G |
| 4,210,877 | 7/1980 | Pleasance et al. | 331/94.5 PE |
| 4,498,183 | 2/1985 | Levatter | 372/87 |
| 5,008,593 | 4/1991 | Schlie et al. | 315/39 |
| 5,055,741 | 10/1991 | Schlie | 315/39 |
| 5,117,434 | 5/1992 | Oohashi et al. | 372/56 |
| 5,235,251 | 8/1993 | Schlie | 315/112 |
| 5,301,203 | 4/1994 | Schlie et al. | 372/70 |

*Primary Examiner*—Rodney B. Bovernick
*Assistant Examiner*—Robert E. Wise
*Attorney, Agent, or Firm*—Jacob N. Erlich; Stanton E. Collier

[57] ABSTRACT

A compact, high-repetitively(rep)-rate photolytic atomic iodine laser (PIL) using blowdown flow and cryogenic pumping increases the rep rate from 0.5 Hz to at least 10 Hz. The average power of the pulsed laser increases from 35 to 700 Watts output. The present invention maintains the demonstrated beam quality of better than 1.5 x diffraction limited, a coherence length of greater than 45 meters, to J/pulse output energy; polarization extinction ratio greater than 100:1; pulse length of 7–12 sec; and jitter less than 1 radian. The laser power and beam quality in this type of device is relatively insensitive to the actual fuel pressure and temperature in the laser cavity at the time of the pulse. The cavity pressure is allowed to vary between plus or minus thirty percent of the optimal value of the cavity height-pressure product of 300 torr-cm during the run period of nominally twenty seconds. Flow is established by boiling liquid $C_3F_7I$ at a temperature of 10° C. A high-thermal-conductivity aluminum foam provides thermal mass for boiling the liquid uniformly for the designed duration burst operation. Flow through the gain cell is transverse to the lasing optical axis, in contrast with the longitudinal flow in the previous 70 J device. The gas flow through the cavity is initiated and turned on and off with a large diameter fast valve. An adjustable flow straightener ahead of the gain region provides pressure drop to insure uniform flow over the entire cross sectional area.

31 Claims, 25 Drawing Sheets

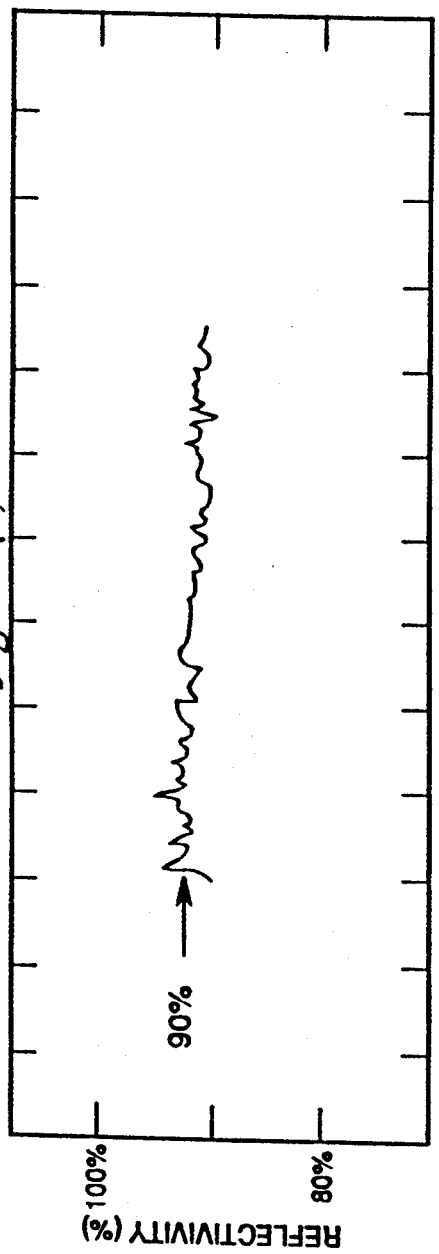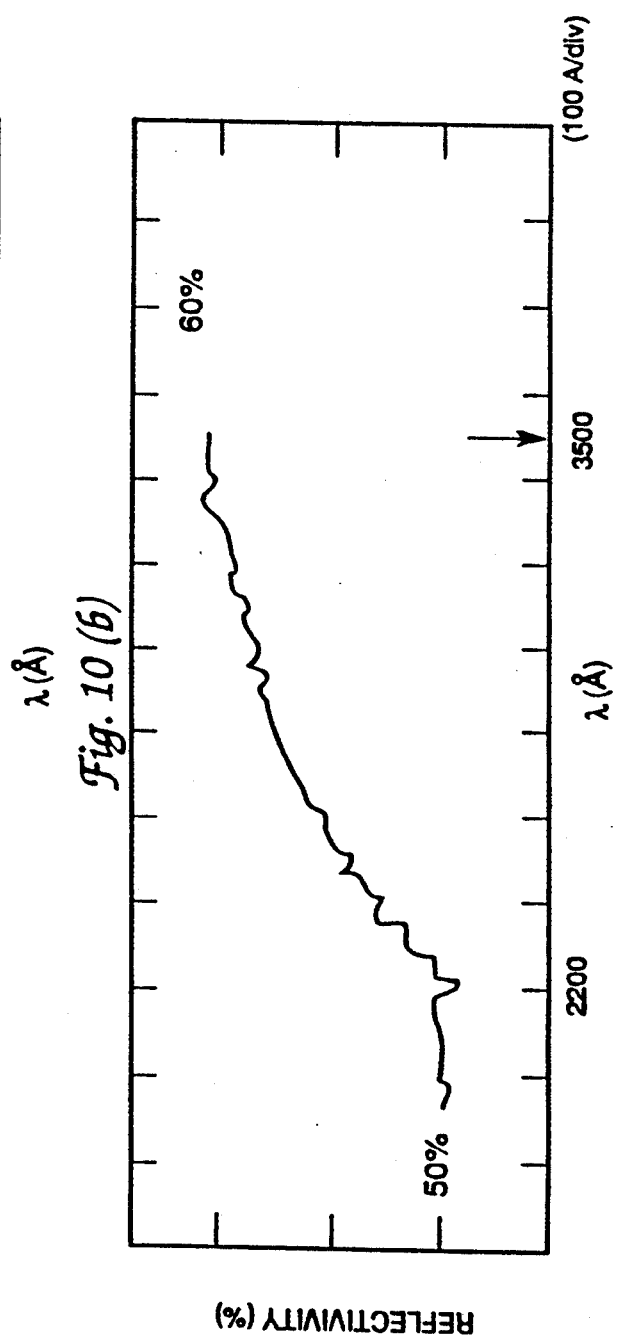

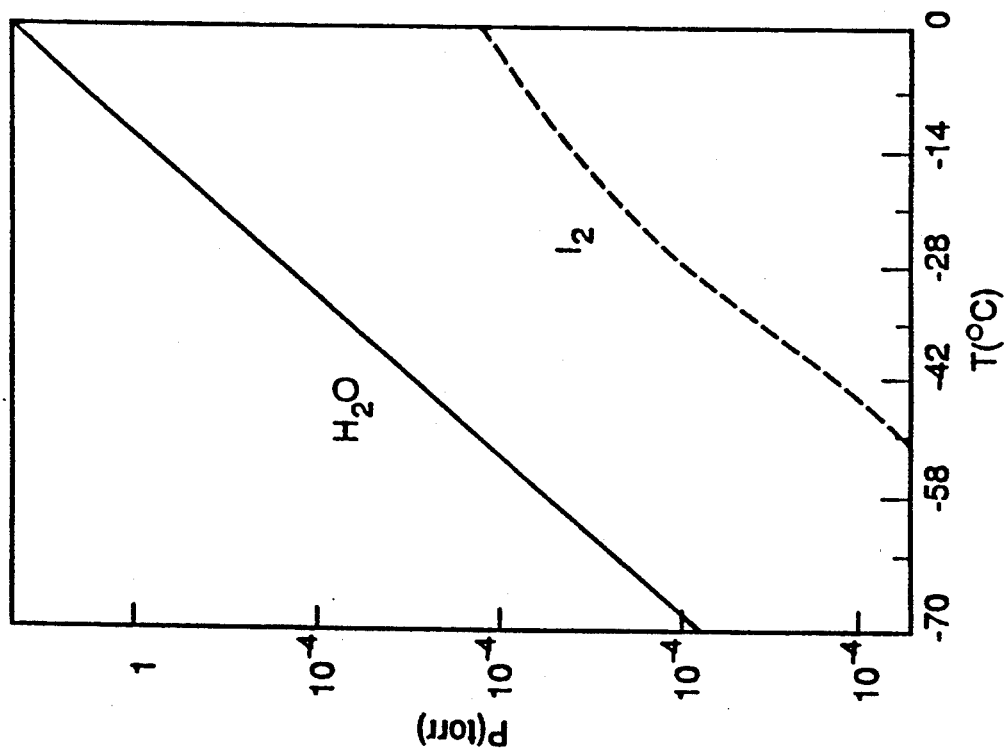
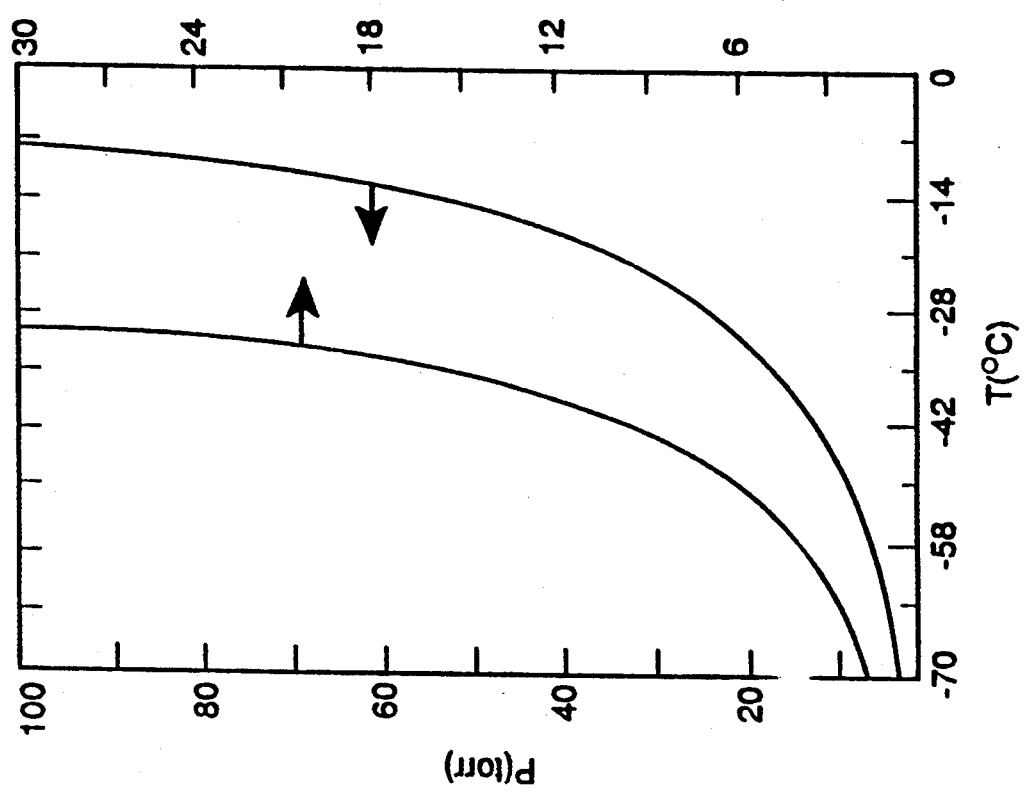

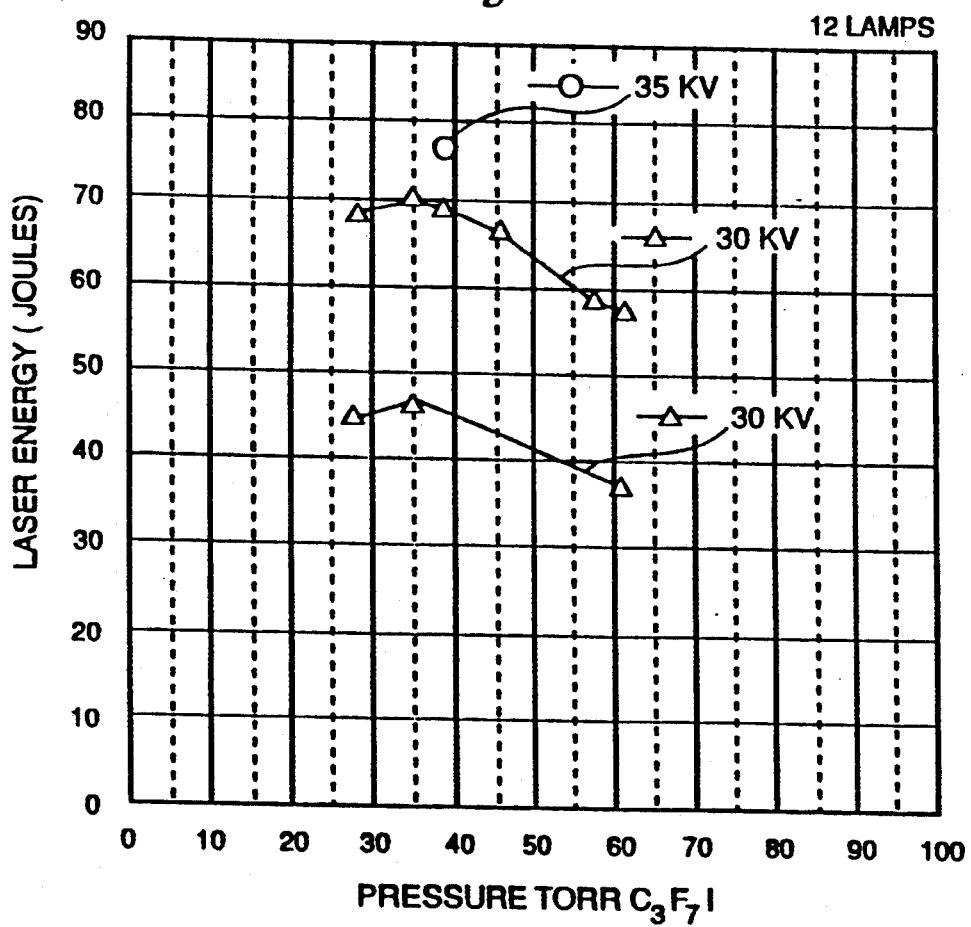

T = 10%

E = 22.28
I_p = 12.1KA
5μs/cm

T = 20%

E = 40.25J
I_p = 12.1KA
5μs/cm

T = 30%

E = 40J
I_p = 12.1KA
5μs/cm

T = 39%

E = 51.8J
I_p = 121k Amp
5μs/cm

T = 59%

E = 52.9J
I_p = 12.1KA
5μs/cm

T = 80%

E = 58.6J
I_p = 12.1KA
5μs/cm

BQ < 1.3→1.1

ENERGY 17.25 JOULES PER PULSE

LAMP INPUT ENERGY 632 JOULES
10 SECONDS PER INCH, OR 1/2 HERTZ REP RATE

HIGH REFLECTOR BLOCKED

ENERGY PER PULSE

LASER OFF
AVERAGE POWER 8.29 WATTS
4 MINUTE RUN

POWER

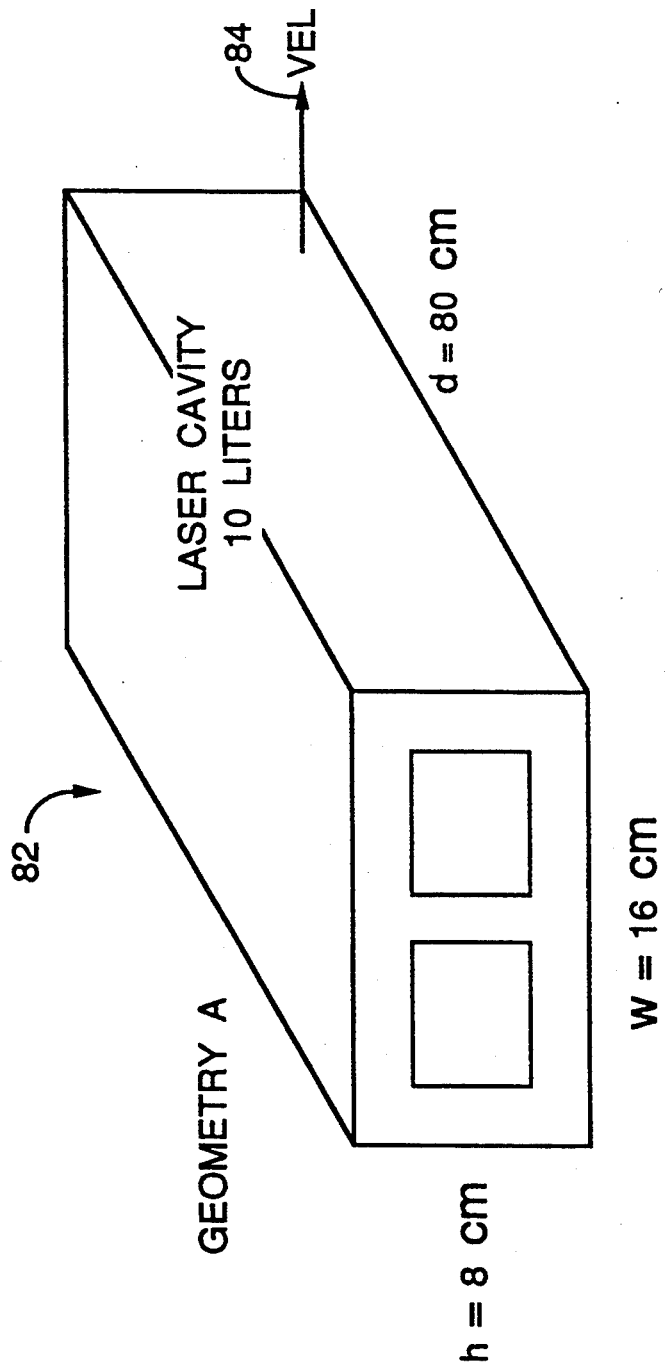

COMPACT, BURST MODE, PULSED, HIGH ENERGY, BLOWDOWN FLOW PHOTOLYTIC ATOMIC IODINE LASER

STATEMENT OF GOVERNMENT INTEREST

The invention described herein may be manufactured and used by or for the Government for governmental purposes without the payment of any royalty thereon.

BACKGROUND OF THE INVENTION

Recently there has been much interest and success in the development of photolytic atomic iodine 1.315 micron lasers. Germany's Asterix pulsed photolytic iodine laser routinely produces single shot energies of 1.0 kilojoule in less than 1 nsec giving terawatt power-levels. Other scientists have also reported very high performance using explosively compressed inert gas flashlamps. Likewise, research on cw photolytic atomic iodine lasers at 1.315 microns has demonstrated remarkable progress. Pulsed energies greater than 70 joules per pulse at 0.5 Hz have been demonstrated in the lowest order unstable resonator mode along with excellent coherence length, beam quality, and polarization. In addition, pulsed high energy, photolyric iodine laser technology has been advanced to a simple and reliable operation employing an iodine ($I_2$) removal flow system. The pulsed photolytic iodine source has been used as a coherent illumination source for long-range imaging experiments. Because of the need for compactness in a non-laboratory environment, an improved system eliminating the volume associated with a closed flow loop is required.

SUMMARY OF THE INVENTION

A high energy, high repetition rate, burst mode, pulsed photolytic atomic iodine laser uses an iodine gain medium which is pulsed by flashlamps. The iodine gain medium is $C_3F_7I$ and is provided by a closed cycle, passive thermally driven high-flow and high-pump rate system. The gas is provided by a boiling liquid fluid source, with cryogenic vacuum pumping, $I_2$ removal and flow uniformity control. The flashed laser gain medium flows traversely across the gain cell where a resonator system being stable/unstable with parasitic control is used.

The objective of the present invention is to provide a laser system with a repetition rate of at least 10 Hz at a pulse energy of at least 70 Joules.

Another object of the present invention is to provide a very compact means of fueling and pumping this high repetition rate, high flow rate laser;

Another object of the present invention is to provide a means of taking the laser from a standby mode to full-power, full-specification operation in less than one second by virtue of its burst-mode design;

Another object of the present invention is to provide a means of maintaining the beam quality achieved in similar, low repetition rate laser devices by carefully controlling the flow of the laser medium through the gain region with the pulse rate increased from 0.5 Hz to 300 Hz, and the average electrical power input increased from 14 kilowatts to 280 kilowatts;

Another object of the present invention is to provide a means of insuring the pressure of the laser medium is maintained constant at the desired working pressure of 30–45 torr (Pd=225–337 torr-cm) for the desired laser operation time of several minutes;

Another object of the present invention is to provide a chosen operating temperature and thermal mass which is sufficient to absorb the entire volume of gas required for the burst-mode duration;

Another object of the present invention is to provide a means for purification of the $C_3F_7I$ laser media between bursts, and thermal-recycling of the flow source and pump devices by rewarming and re-cooling, respectively, over a 15–30 minute period, thus permitting repeated bursts for a virtually indefinite total operating time;

Another object of the present invention is to provide a fast flow stop-start control technique (under one second) which allows operation in any combination of sub-bursts, of any arbitrary time duration, the sum of the sub-burst durations less than the design burst length;

Another object of the present invention is to provide a easy/reliable long-term operation in a field/industrial environment with fueling, materials, and cryogenics chosen to be compatible with existing industrial technologies and methods; and Another object of the present invention is to provide a means of coupling any source of intense UV radiation into the photolytic gain region. Currently known techniques include Xenon discharge quartz flashlamps (analyzed herein), surface discharge lamps, explosive flashlamps, magneto-compressed discharges, laser-produced plasma flashlamps, and pulsed microwave discharges.

These and many other objectives and advantages of the present invention will be readily apparent to one skilled in the pertinent art from the following detailed description of a preferred embodiment of the invention and the related drawings.

BRIEF DESCRIPTION OF THE DRAWINGS

FIGS. 10(a) to (b) illustrate the reflectance properties of two different types of aluminum surfaces.

FIGS. 11(a) and (b) illustrate the vapor pressure curves for species important in long term operation of photolytic iodine lasers.

FIG. 14 illustrates laser energy versus $C_3F_7I$ pressure for 12 lamp arrangement at different flashlamp capacitor energies with an unstable resonator of magnification M=3.

FIG. 21 illustrates a cavity arrangement for series-geometry laser flow, showing flow rate derivation.

DESCRIPTION OF THE PREFERRED EMBODIMENT

Figure 1A:
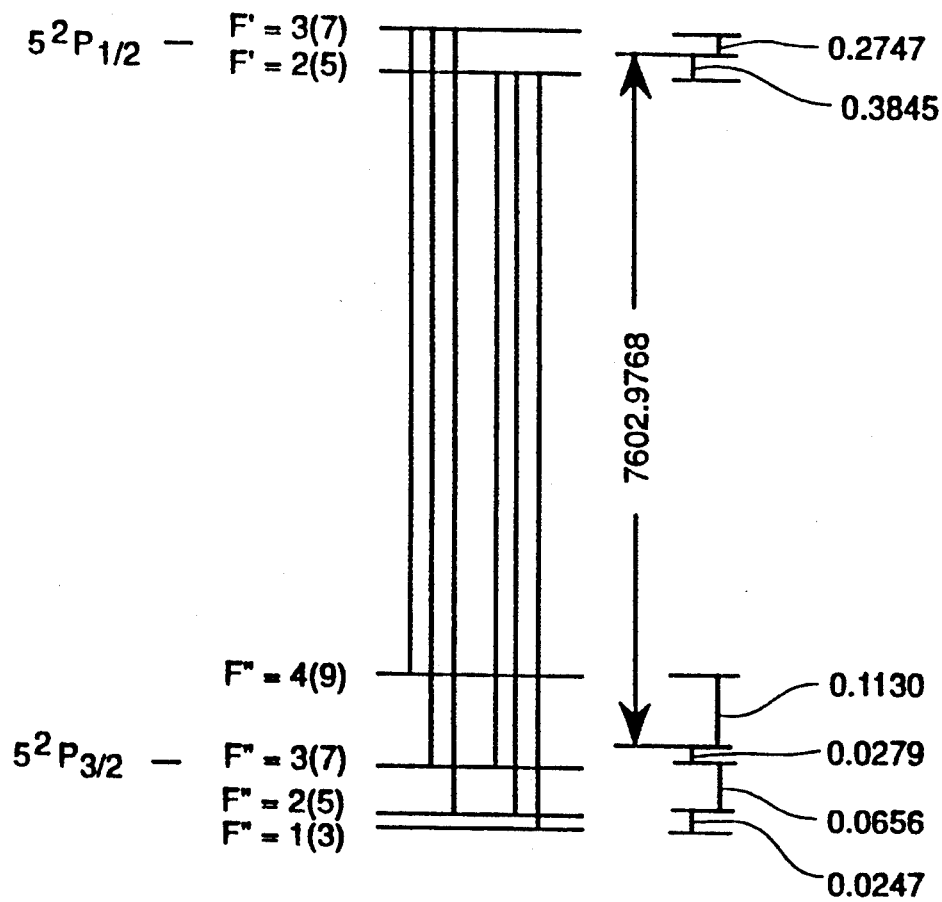
FIG. 1(a) illustrates the hyperfine structure of atomic iodine as function of wave number along with its associated transitions for $5^2P_{\frac{1}{2}}$ and $5^2P_{3/2}$ states. In parenthesis is g, the degeneracy ($=2F+1$) of the iodine hyperfine level while in (b), is shown the intensity level of the iodine transitions. The number in parenthesis is the relative intensities, and F denotes the quantum number. All energy spacings are given in inverse centimeters.
Figure 1B:
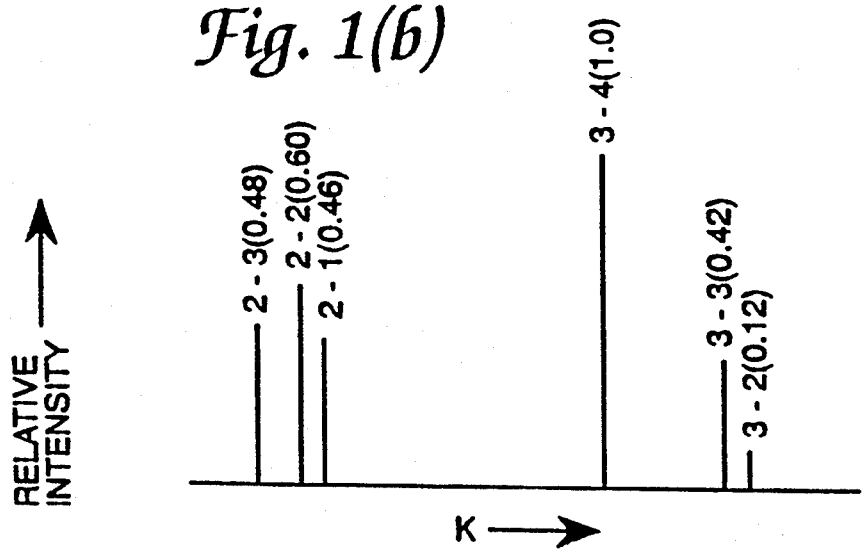
Figure 2A:
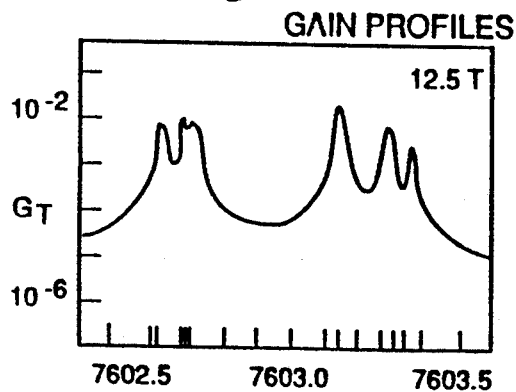
FIGS. 2(a) to (f) illustrate the sum of fractional gain and phase shift (degrees) profiles for three different pressures of $C_3F_7I$.
Figure 2D:
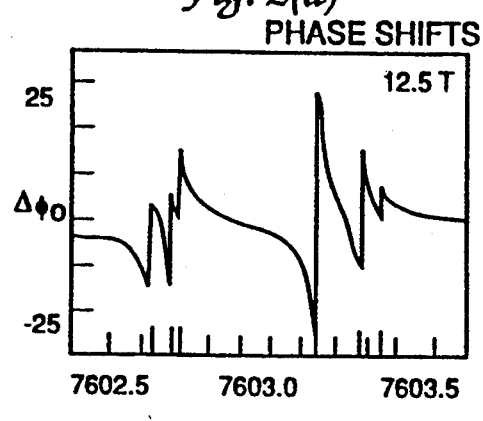
Figure 2B:
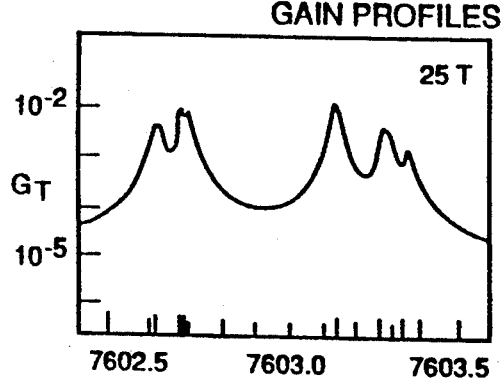
Figure 2E:
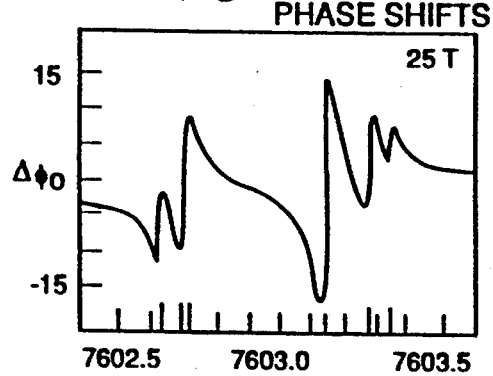
Figure 2C:
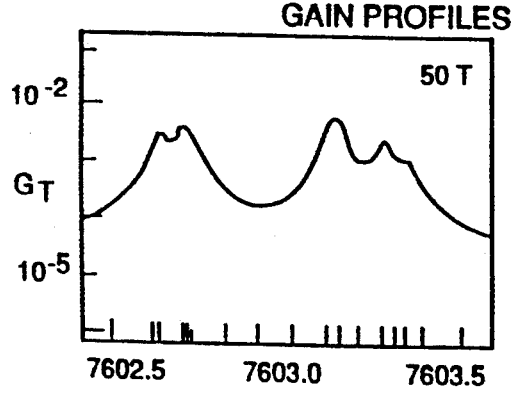
Figure 2F:
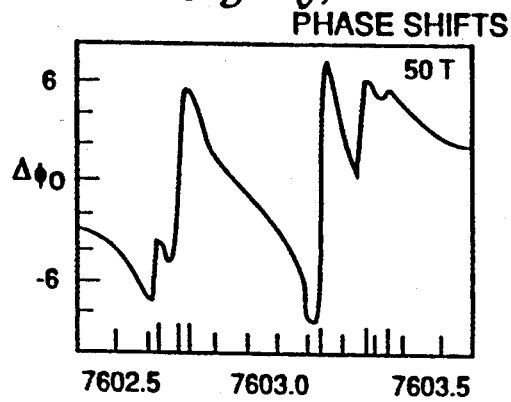

In iodine there exists a significant amount of hyperfine of both the ground and the excited states. The selection rules for different transitions between hyperfine levels are $\Delta F=0$, I 1 with F' (upper level)=0→F" (lower level)=0, not allowed. There exists 2J+1 values for F; i.e., two for the upper-state and four for the lower-state levels of atomic iodine. In FIG. 1(a), these energy levels are depicted for the both the ground $5^2P_{3/2}{}^{(I)}$ and the first excited $5^2P_{\frac{1}{2}}{}^{(I^*)}$ states, along with their degeneracies (g=2F+1). As shown in FIG. 1(b) the transitions are governed by the above selection rules plus the relative intensities of each transitions. The dominant transition is F'=3 to F"=4. Table I lists the wavelengths in both micrometers and wave numbers (k=1/λ) in centimeters of each transition cited plus their A-coefficients.

TABLE I

| Transition F' → F" | Wavelength[b] k (cm⁻¹) | λ (μm) | A-coefficients (sec⁻¹) |
|---|---|---|---|
| 2-3 | 7602.6202 | 1.315336 | 1.76 |
| 2-2 | 7602.6858 | 1.315325 | 2.20 |
| 2-1 | 7602.7105 | 1.315320 | 1.69 |
| 3-4 | 7603.1385 | 1.315246 | 3.67 |
| 3-3 | 7603.2794 | 1.315222 | 1.54 |
| 3-2 | 7603.3450 | 1.315211 | 0.44 |

The existence of these six iodine hyperfine transitions have a significant affect on the coherence length of atomic iodine lasers. Since the coherent length varies inversely with the linewidth, the number of oscillating hyperfine transitions is important. The coherence length ($L_c$) equates to $c/\Delta v$ or $1/\Delta k$ where c is the velocity of light, $\Delta v$ is the linewidth of the laser, and $\Delta k$ is the corresponding wave number difference. If all six of the iodine hyperfine transitions existed in the laser output, then $\Delta k=0.725$ cm⁻ giving a small coherence length of 1.37 cm. For simplicity, only the line center $\Delta k$ values are used here. With only the two highest gain hyperfine transitions, F'=3→F"=4 and 2→2, oscillating, $\Delta k=0.453$ cm⁻¹ yielding a laser coherence length of 2.21 cm. This simple analysis relates that long coherence lengths will exist only if a single hyperfine transition oscillates.

When only one hyperfine transition is lasing, there is still a significant decrease in the iodine laser's coherence length if two or more longitudinal modes are oscillating. With the unstable mirror spacing at 2.84 meters, a c/2L value of 52.8 MHz results corresponding to a coherence length 5.68 meters. Since the Doppler broadened linewidth 240 MHz (FWHM) at room temperature (and over 230 MHz at the 10° C. lasing gas temperature in the present device) is much larger than this c/2L value, more than one longitudinal mode is possible. For a $C_3F_7I$ laser the optimum operating pressure of $C_3F_7I$ is 30-45 torr, FIG. 3. For this pressure range, the large 20 MHz/torr broadening coefficient of $C_3F_7I$ causes the iodine hyperfine transitions to become homogeneously broadened to linewidths of 600 to 900 MHz. Calculated gain profiles in FIGS. 2(a-c) verify this condition. Since a homogeneously broadened gain profile has only one oscillating longitudinal mode in steady state, coherence lengths for this pulsed iodine laser are expected to be large as similarly observed in cw photolytic iodine laser. The angular separation of transverse modes for the chosen unstable resonator insures near-instantaneous transient mode selection, achieving the dominance of one mode very early in the pulse build-up.

With 240-320 nm UV (ultraviolet excitation radiation, n-$C_3F_7I$ (normal form) is photolytically excited into an excited iodine $5^2P_{\frac{1}{2}}$ atom and a free n-$C_3F_7I$ radical specie with nearly 100% quantum yield. This photoexcitation cross section is given in FIG. 3. Other alkyl-iodides (e.g., i-$C_3F_7I$ and $C_3F_7I$) have similar high quantum yield values, but n-$C_3F_7I$ is used since it is easier to procure in the United States. The iso-form of $C_3F_7I$ is believed to have an "effective" higher re-association rate because the formation of $(C_3F_7)_2$ is much slower. Hereafter, all citing of n-$C_3F_7I$ is denoted simply by $C_3F_7I$. The photolysis cross section peaks near 272 nm with a magnitude of $\sigma_p \approx 7.8 \times 10^{-19}$ cm². This cross section $\sigma_p$ can be used to establish the $C_3F_7I$ operating pressure for a specific cross sectional area of an iodine laser medium. Since the photolyric cross section extends over the 240–320 nm region, a mean approximate value of $4 \times 10^{-19}$ cm$^2$ provides a better estimate for the mean free path length calculations. Table II lists these mean free path lengths $l_p (=1/N\sigma_p)$ for various C$_3$F$_7$I pressures where N represents the C$_3$F$_7$I partial density. For a situation requiring uniform excitation by UV pumping from a single side, the mean free path of the UV radiation must be significantly larger than the gain medium's transverse dimension d.

TABLE II

| n-C$_3$F$_7$I Pressure (torr) | Mean Free Path Length-$l_p$ (cm) |
|---|---|
| 5 | 15.3 |
| 10 | 7.67 |
| 15 | 5.11 |
| 20 | 3.83 |
| 25 | 3.07 |
| 30 | 2.56 |
| 35 | 2.19 |
| 40 | 1.92 |
| 45 | 1.70 |
| 50 | 1.53 |
| 55 | 1.39 |
| 60 | 1.28 |
| 70 | 1.10 |
| 80 | 0.96 |
| 90 | 0.85 |
| 100 | 0.77 |

Square or rectangular physical geometrics having excitation from 2 or more sides require uniform pumping when $d \approx 4l_p$. Although most of the following discussion will cover the two-sided pumping case, extension to one-sided pumping is possible with $d \approx 2\lambda_{92}$. Establishment of uniform gain throughout the photolyrically excited volume greatly simplifies constraints for the unstable resonators used in optimizing the extractable laser energy. A nearly uniform near-field laser beam profile in the lowest mode operation is observed at C$_3$F$_7$I pressures of 30–45 torr in the 7.5 × 7.5 cm$^2$ cross section excited on opposite sides. The corresponding $l_p$ is 2.56–1.70 cm which is approximately d/4. For the corresponding one-sided pumping case, a working pressure of 15–25 torr is more optimum for 2.5 cm square gain cavities.

Figure 15A:
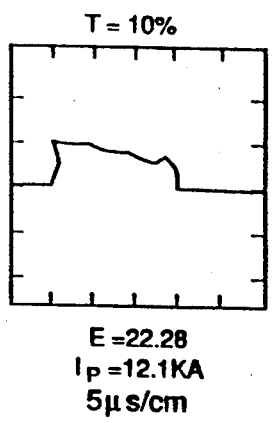
FIGS. 15(a) to (f) illustrate the effect of output coupling with the stable resonator on laser pulsewidth using 8 lamps for photolytic pumping.
Figure 15B:
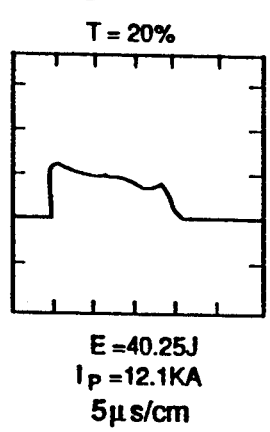
Figure 15C:
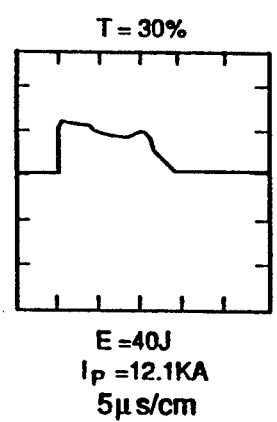
Figure 15D:
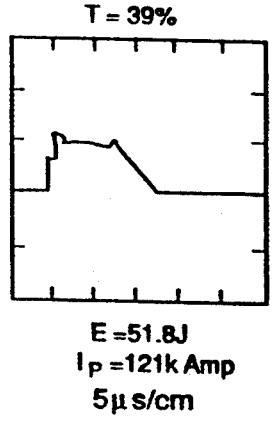
Figure 15E:
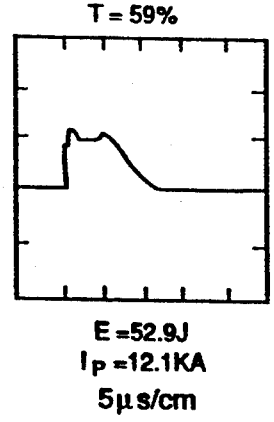
Figure 15F:
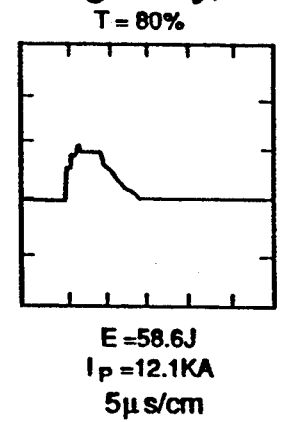
Figure 16:
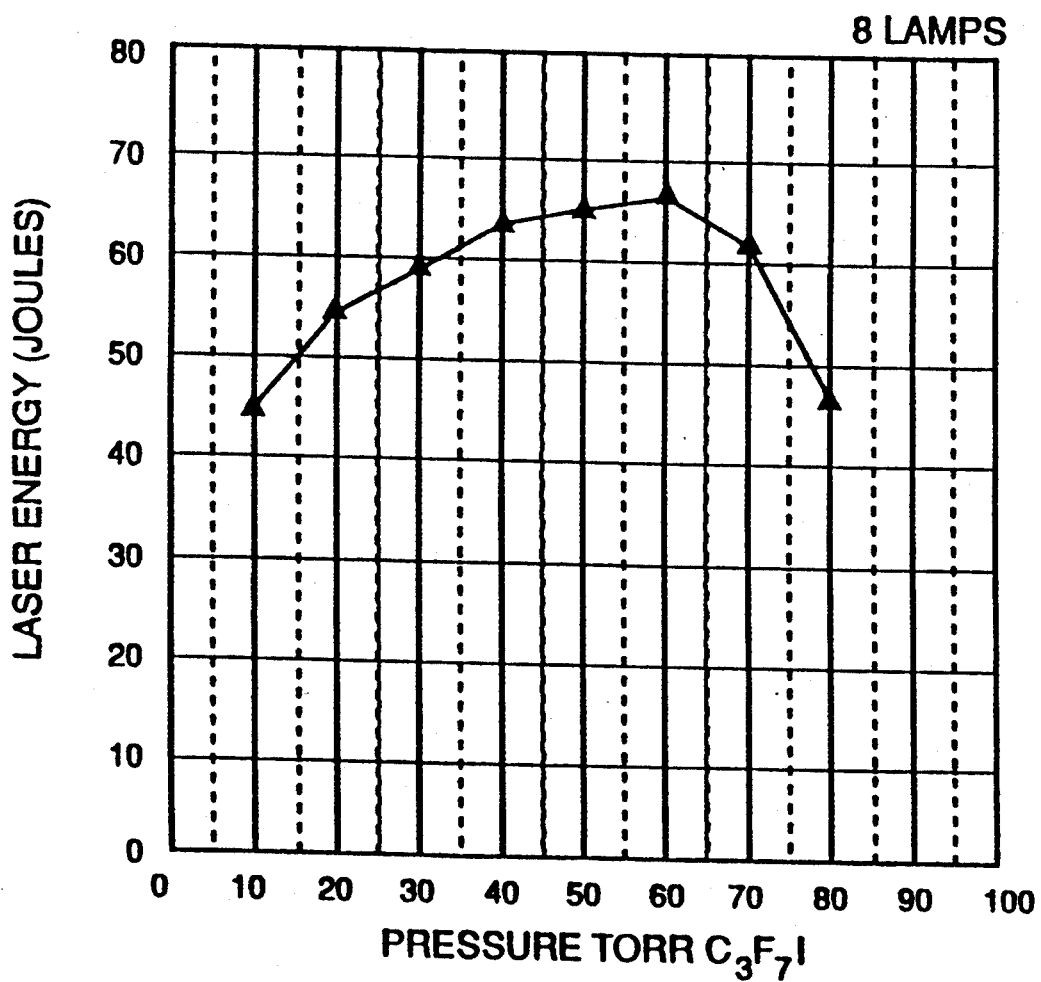
FIG. 16 illustrates performance of the laser of the present invention for various pressures using a stable resonator.

A simple analysis of the flashlamp output and the subsequent UV radiation interaction with the C$_3$F$_7$I in the gain medium provides valuable insight into the operation of this repetitively pulsed photolytic atomic iodine laser. First, the peak input power deposited into the flashlamps was approximately 300 MW, FIG. 15(b). Accounting for the twelve (12) 1 cm i.d., 80 cm arc length flashlamps excited by a 3.8 μ f capacitor charged to 30 KV gives the lamp's output intensity of 80 KW/cm$^2$. Using a nominal UV conversion efficiency of 2% yields an intensity of 1.25 KW/cm$^2$ corresponding to a fluence of $2.5 \times 10^{21}$ photons/cm$^2$-sec at the 272 nm C$_3$F$_7$I peak cross section. Assuming a 10 μsec flashlamp square pulse, a peak excited iodine density of 10$^{16}$/cm$^3$ can be produced if there exists 30 torr of C$_3$F$_7$I in the gain region. This excited iodine density corresponds to an unsaturated small signal gain coefficient of 5%/cm. For an excited iodine density of 10$^{16}$/cm$^3$, only 1% of the C$_3$F$_7$I laser fuel is being excited which is small in comparison to explosively excited iodine lasers which experience nearly 100% bleaching. Single-sided pumping at 15–25 torr is still only 2% photolysis. Nearly uniform gain across the cross sectional area was verified by the unstable resonator device beam-quality for the two-sided case. These low fractional excitations enable the closed cycle, iodine removal system to operate successfully. This low excitation fraction also will be important in the analysis of the thermo-accoustic input to the media which will be an important factor as the repetition rate increases.

Once the C$_3$F$_7$I molecules are photolyzed, various kinetic process occur in the iodine gain medium as listed in Table III. There are many other kinetic mechanisms existing, but the

TABLE III

| Reaction | Rate Coefficient |
|---|---|
| 1. RI + $h\nu_{pump} \rightarrow$ R + I | $\sigma_p(max) = 7.8 \times 10^{-19}$ cm$^2$ |
| 2. I* $\rightarrow$ I + $h\nu_{rad}$ | A = 7.7 sec$^{-1}$ |
| 3. I* $\rightarrow$ I + $h\nu_{laser}$ | $\sigma_{se} = 5.5 \times 10^{-18}$ cm$^2 f$ |
| 4. I* (diffusion) $\rightarrow$ I | D(STP) = 0.009 cm$^2 \cdot$ sec$^{-1}$ |
| 5. I + R $\rightarrow$ RI | $4.7 \times 10^{-11}$ |
| 6. I* + R $\rightarrow$ RI | $7.9 \times 10^{-13}$ |
| 7. R + R $\rightarrow$ R$_2$ | $1.3 \times 10^{-12}$ |
| 8. I* + RI $\rightarrow$ I + RI | $2.8 \times 10^{-16}$ |
| 9. I* + O$_2$ $\rightarrow$ I + O$_2$*($^1$66 $_g$) | $2.5 \times 10^{-11}$ |
| 10. I* + H$_2$O $\rightarrow$ I + H$_2$O + heat | $9.6 \times 10^{-13}$ |
| 11. I* + N$_2$ $\rightarrow$ U + N$_2$ + heat | $5.2 \times 10^{-17}$ |
| 12. I* + I + RI $\rightarrow$ I$_2$ + RI | $3.8 \times 10^{-31}$ |
| 13. I* + I + I$_2$ $\rightarrow$ 2I$_2$ | $3.7 \times 10^{-30}$ |
| 14. I* + I$_2$ $\rightarrow$ I + I$_2$ | $9.9 \times 10^{-12}$ | list provided highlights the most important features. Temperature dependent rates which play a very significant role in the overall kinetics of the pulsed photolytic iodine laser system are not included in this list. For the results reported here, no buffer gas was used. This list of kinetic processes emphasizes the photolytic excitation, quenching, "parent" molecule recombination, formation of I$_2$ by-product, and radiative/stimulated processes. Some processes are included to emphasize the C$_3$F$_7$I laser fuel purity requirements.

Pulsed photolytic atomic iodine lasers have always been easy to demonstrate due to high peak ultraviolet radiation generated from flashlamps. The extractable energy, however, can vary significantly due to impurities and the photolytic by-product I$_2$. Elimination of O$_2$, H$_2$O, and I$_2$ is essential to minimize these excited iodine quenching processes. The result is higher energies along with earlier onset of lasing relative to the flashlamp's initiation. In the absence of such impurities, only two quenching processes for the excited iodine atoms exists. These are the re-association of the parent molecule (reaction 6 of Table III) and quenching by the parent molecule (reaction 8). Hence, the quenching processes are

$$I^* + R \rightarrow RI \tag{1}$$

$$I^* + RI \rightarrow I + RI \tag{2}$$

having respectively rate constants of $7.9 \times 10^{-13}$ and $2.8 \times 10^{-16}$ cm$^3$.sec$^{-1}$. Hereinbelow relates an optimum C$_3$F$_7$I operating pressure of 30–45 torr and 26%/cm gain coefficients. Using the iodine stimulated emission cross section, $\approx 10^{-18}$ cm$^2$ at 500 MHz pressure broadening gives an excited iodine density of $10^{-16}$ cm$^3$. For these conditions in an iodine gain medium, the I* loss rates are respectively 7900 and 274 sec$^{-1}$. During a 10 μsec laser pulse, these processes have negligible effects.

The I* quenching processes due to O$_2$, H$_2$O, and N$_2$ impurities are particularly important since all of the gases can easily be dissolved in liquid C$_3$F$_7$I. To emphasize their detrimental effects, it is assumed that the quenching rate from these impurities must be less than 1/10 of the lowest non-purity quenching rate process, namely C$_3$F$_7$I quenching, reaction (8) in Table III. Referring to the above analysis, the concentrations of O$_2$, $H_2O$, and $N_2$ must, respectively, be less than $1.83 \times 10^{13}/cm^3$ (0.5 microns), $4.6 \times 10^{14}/cm^3$ (13.6 microns), and $8.7 \times 10^{19}/cm^3$ (3.26 Atm). Consequently, removal of all $O_2$ and $H_2O$ impurities from the laser gas $C_3F_7I$ is mandatory. $N_2$, however, produces negligible quenching. Any significant concentrations of $N_2$, however, will decrease the stimulated emission cross section due to pressure broadening.

Another major kinetic quenching process in photolytic atomic iodine lasers is the $I^*$ quenching by the photolytic by-product $I_2$ (reaction 14), namely $$I^* + I_2 \rightarrow I + I_2 + heat \qquad (3)$$

which has a large quenching rate constant, approximately $10^{-1}$ cm$^3$-sec$^{-1}$. The effect of this quenching process will increase during the photolytic UV pumping pulse because $I_2$ is a by-product of the irreversible recombination channel of the photolyzed $C_3F_7I$. Since the only mechanism to destroy the $I_2$ as it is formed in the lasing medium is the small dissociation by 500 nm radiation, flow must be used to transfer it from the laser gain region for subsequent removal by condensation. The rate coefficients for the two possible ternary iodine dimerization processes are listed in Table III (processes 12 and 13) and assumed to be equal for each of the species M ($C_3F_7I$ and $I_2$). A quick analysis, however, illustrates that negligible $I_2$ is formed during the 7-12 $\mu$sec laser pulse reported below. At the maximum $C_3F_7I$ pressure of 60 torr used below, the concentration of $C_3F_7I$ is $1.96 \times 10^{18}/cm^3$. No degeneracy effects are included. For reaction (12) of Table III, the 3-body formation rate by $C_3F_7I$ is then $7.5 \times 10^3$ sec$^-$ or 1/134 $\mu$sec. Therefore, during lasing no significant excited iodine quenching by $I_2$ should be expected. Its removal by the iodine ($I_2$) removal system, however, is crucial.

Important to all atomic iodine lasers is the effect of gain medium density fluctuations on the quality of the output laser beam. A quantitative understanding of the effect of fluctuations becomes crucial with a high flow, high repetition rate system because the level of tolerable fluctuations is an important requirement to use in the flow system engineering. The ability to obtain a near diffraction-limited optical beam critically depends on the magnitudes of two parameters; namely, the spatial variation of these gas density fluctuations characterized by the gain medium's $\Delta N/N$ or $\Delta \rho/\rho_0$ variation and the refractivity, $\Delta n$, or polarizabllity $\alpha$/Gladstone-Dale constant $\beta$, of the individual gaseous species present. $\beta$ and $\alpha$ are related as $\beta = 2\pi\alpha \times N_s$ where $N_s$ is the particle density at STP conditions, $2.68 \times 10^{19}/cm^3$ and $\Delta n = 2\pi\alpha N$ with N equal to the total number density of the gas being examined. Table IV lists these

TABLE IV

| Gas | 4880 [λ (Å)] | 5145 [λ (Å)] | 13150 [λ (Å)] |
|---|---|---|---|
| $H_2O$ | 1.50 (2.526) | 1.55 (2.610) | 1.49 (2.509) |
| $N_2$ | 1.78 (2.997) | 1.77 (2.980) | 1.77 (2.980) |
| $O_2$ | 1.62 (2.728) | 1.62 (2.722) | 1.57 (2.644) |

TABLE IV-continued

| Gas | 4880 [λ (Å)] | 5145 [λ (Å)] | 13150 [λ (Å)] |
|---|---|---|---|
| $I_2$ | g | g | 12.5 (21.049) |
| $C_3F_7I$ | 12.0 (20.207) | 12.1 (20.375) | 11.6 (19.533) | parameter for species present in the pulsed photolyric iodine gain mediums. The magnitude of each of these quantities dictate the non-constant cross-sectional phase shift difference, $\Delta\theta$ (radians), an optical beam experiences while propagating through a medium of length L with spatially varying density and is expressed as $$\Delta\phi = k\beta \frac{\rho_o}{\rho_s} \int_0^L \frac{\Delta\rho}{\rho_o} dz \qquad (4)$$

where $\Delta\rho$ is the gas density disturbance relative to equilibrium conditions and equal to $(\rho - \rho_o)$ where $\rho$ is the perturbed gas density and $\rho_o$ the equilibrium, nonperturbed gas density value. $\rho_s$ is the gas density at STP conditions and $\Delta N = N - N_o$, the particle density difference. Assuming a maximum single pass phase shift across the gain media less than 1/10 wave over the 150 cm gain length reported below, Eqn. (4) relates $\Delta\rho/\rho_o$ must be less than $1.75 - 2.6 \times 10^{-3}$ when the initial operating $C_3F_7I$ pressure of 30-45 torr is taken. Such a requirement can easily be established and is intimately associated with the excellent unstable beam quality reported below.

Previous analysis has shown that the strongest hyperfine transition, namely $F'=3$ to $F''=4$ experiences virtually no additional dispersive effects unlike the other five hyperfine transitions as FIG. 4 illustrates. The results of Table V

TABLE V

| $\Delta\nu$(MHz) | 2-3 | 2-2 | 2-1 | 3-4 | 3-3 |
|---|---|---|---|---|---|
| 50 | −5.784(−2.113) | −5.145(−1.880) | 8.179(2.928) | −0.5318(−0.1943) | 3.177(1.161) |
| 100 | −5.778(−2.111) | −5.084(−1.858) | 8.094(2.957) | −0.5314(−0.1941) | 3.177(1.161) |
| 250 | −5.743(−2.098) | −4.694(−1.715) | 7.551(2.759) | −0.5286(−0.1931) | 3.178(1.161) |
| 500 | −5.620(−2.053) | −3.688(−1.347) | 6.116(2.235) | −0.5129(−0.1896) | 3.182(1.163) |
| 1000 | −5.192(−1.897) | −2.005(−0.7326) | 3.490(1.166) | −0.4211(−0.1758) | 3.122(1.163) |
| 2500 | −3.608(−1.318) | −0.9222(−0.337) | 0.505(0.184) | −0.2677(−0.0978) | 2.978(1.022) | gives the refractivity values, $\Delta n$, for each of the hyperfine transitions for different pressure broadening values. Exciting the $C_3F_7I$ medium with UV radiation from both sides does not produce a perfectly uniform gain medium in the transverse directions. Most likely, a parabolic gain distribution results with the maximum near the UV transmitting windows. The refractive index, n(r) would then be $1 + \Delta n$ hyperfine where the subscript denotes one of the six iodine hyperfine transitions. These refractivity values shown in Table V have both positive and negative values indicating either an internal concave or convex lens. It is very important to notice that the strongest hyperfine transition, $F'=3$ to $F''=4$, has a very small refractivity value relative to the other five transitions.

Figure 5A:
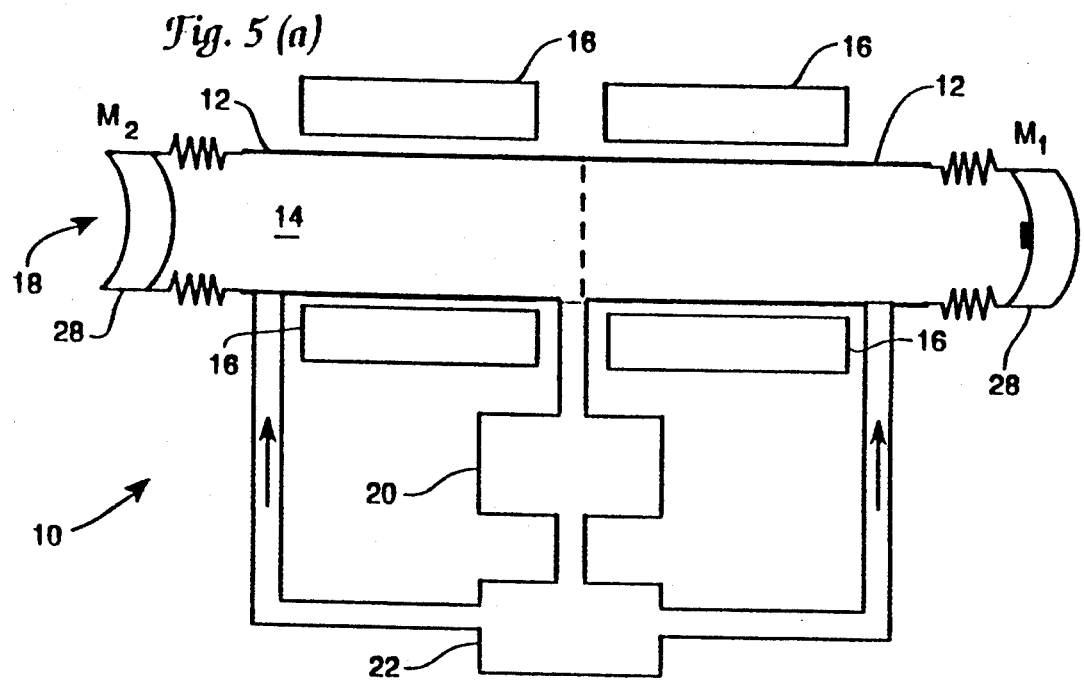
FIGS. 5(a) and (b) to illustrate a longitudinal flowing "repped" pulsed, photolytic atomic laser at 1.315 microns.

A prior repetitively pulsed, high energy, iodine laser system 10 is shown schematically In FIG. 5(a) and comprises at least one laser gain cell $I_2$ with a lasing medium 14 therein; thereabout are positioned UV flashlamps 16. An optical resonator 18 is placed on the gain cell $I_2$ for outputting energy. The lasing medium 14 flows into a scrubber 20 which cleans the laser fuel after which the fuel flows into a turbo-molecular blower 22 which creates the necessary velocity.

Figure 5B:
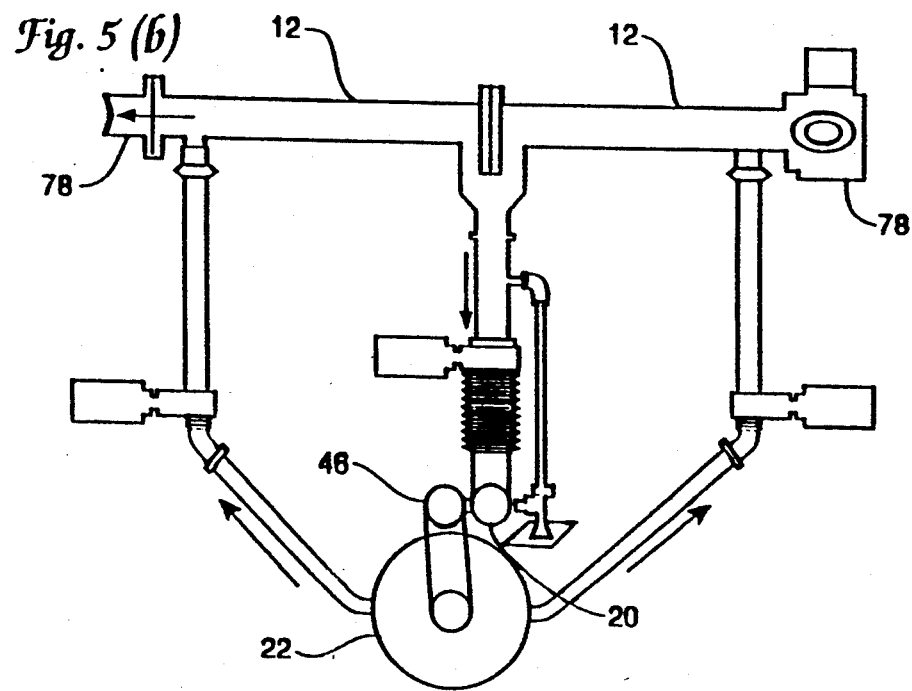
Figure 7A:
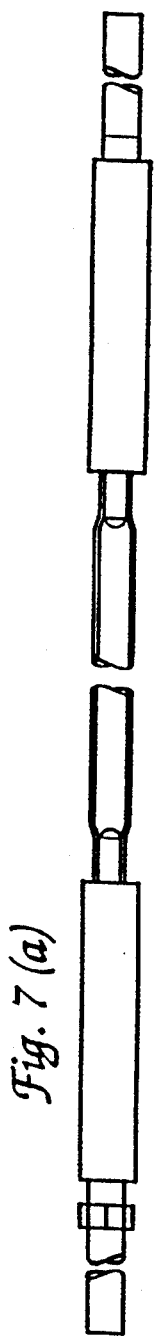
FIGS. 7(a) to (c) illustrate by schematic the flashlamps and the water cooling jacket whenever it is used.
Figure 7C:
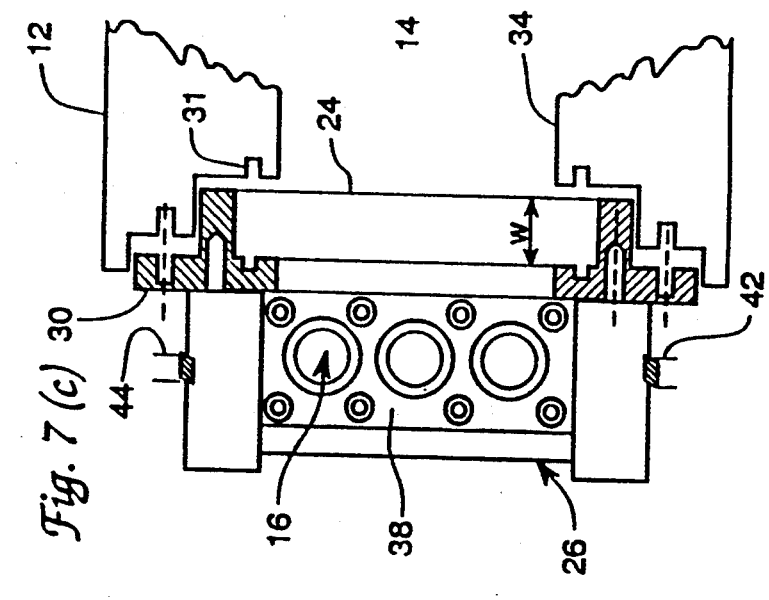
Figure 12:
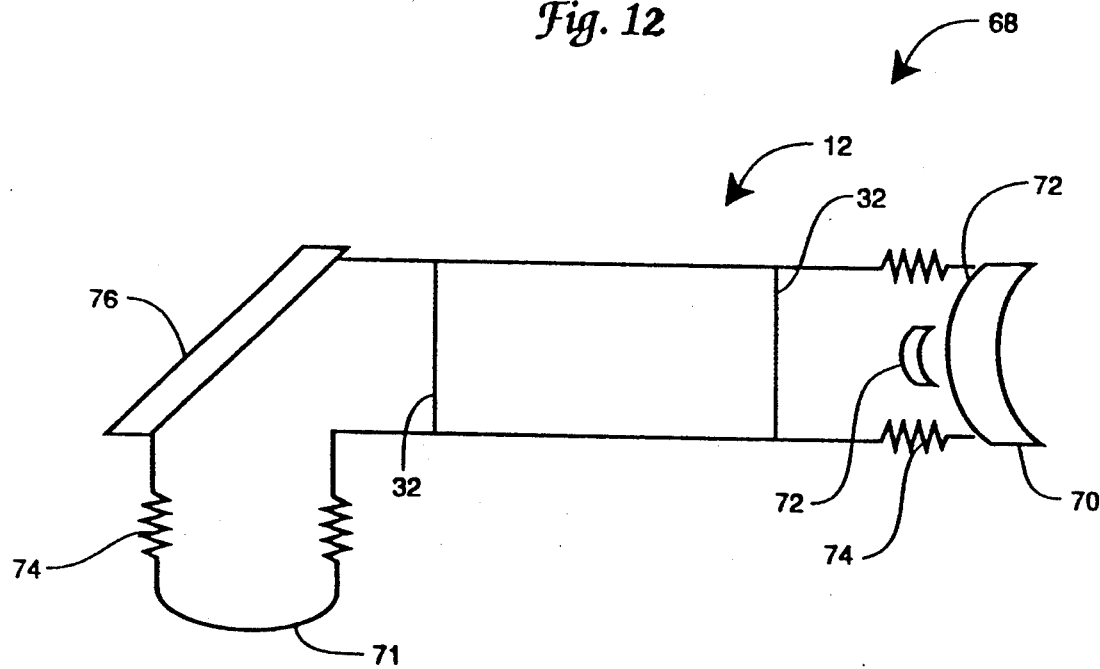
FIG. 12 illustrates the unstable, confocal resonator incorporating square feedback reflecting coating at 1.315 microns.

FIG. 5(b) shows the pulsed iodine laser system 10 consisting of two separate 125 cm long, 7.6 cm square gain cells 12 rotated 90 degrees attached together each having 7.6 cm×80 cm, 2.5 cm thick fused silica transmissive UV windows 24 on opposite sides. See FIG. 7(c) which illustrates a partial cross section through one gain cell showing one side with the flashlamps. The UV flashlamps 16 and reflectors 26 are illustrated in FIG. 7. At both ends of the gain cells 12 are the unstable resonator mirrors 28, FIG. 5(a), plus at one end, a 45° polarizing reflector 76, FIG. 12. These UV windows 24, FIG. 7(c), obtained from Corning Glass 7940 Grade F inclusion Grade 3 were free of OH radical to minimize the formation of color centers. Such centers can produce strong UV absorption in the fused silica during high intensity UV radiation. No such absorptions were experienced. A commercial polish existed on these UV window surfaces. Special attention was taken to seal these windows in such a manner that good vacuum integrity was assured, while minimizing the stresses on these quartz windows. FIG. 7(c) shows the details where a retainer stop 30 having a depth d is larger ($\approx$20 mils) than the width w of the quartz window 24. This thickness difference, w<d, prevented excessive compression on the quartz. Also an O-ring (OR3) prevented this quartz windows 24 from making direct contact with the metal of the gain cells. These O-rings were only the length of the quartz windows 24 and on opposite sides. Due to the high UV intensity generated by the flashlamps, these latter O-rings had to be covered with a thin piece of Al foil. Failure to do this operation resulted in a black coating being deposited on the UV windows.

Figure 7B:
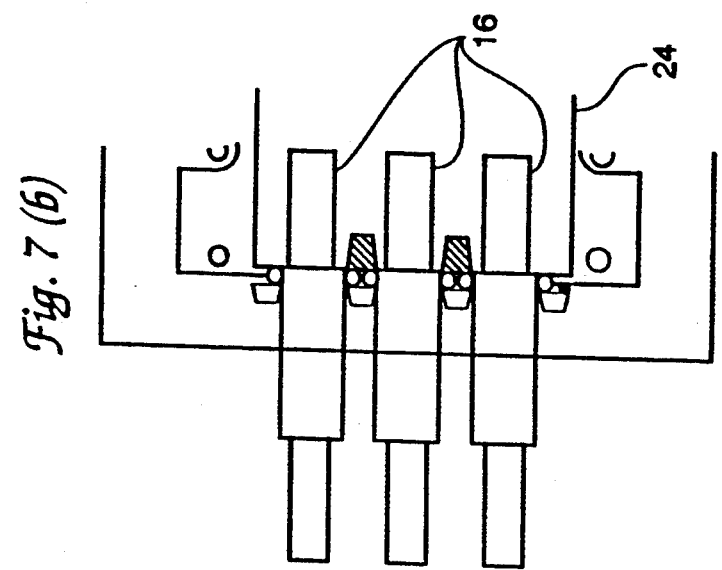

To minimize any possible non-uniformities in the spatial, integrated $g_0L$ values, these two separate gain cells were rotated 90° relative to their UV transmissive windows, although later tests indicated this operation may not be necessary. The iodine gain region's cross section was 7.6×7.6 cm$^2$ with a total active excitation length of 150 cm. Mounted on opposite sides of the gain cells, less than 0.5 cm from the UV windows were three pulsed Xe flashlamps, FIG. 7(a), equally spaced across the 7.6 cm width as shown in FIGS. 7(b)-(c). There was a total of twelve lamps exciting the 8.7 liter laser gain region. The entire gain cell was fabricated of aluminum which has been established to have negligible reaction with the $C_3F_7I$.

Due to the large integrated gains ($g_0^L$) produced in this iodine gain cell, special procedures had to be taken to eliminate parasitic oscillations. First, the Al internal walls were bead blasted with 10 mesh $Al_2O_3$ "chunks" to create a 80-100 mesh equivalent surface texture for minimizing the parasitic oscillation off the Al walls at low incident angles. On the UV window surfaces, a 50 mil high, octagon aluminum "fence" similarly minimized any parasitic oscillation. This basic gain cell is completely suitable for the high repetition rate device with the incorporation of transverse flow. The pumping geometry, optics, and parasitic mode suppression techniques remain unchanged in the burst-mode device.

Figure 8:
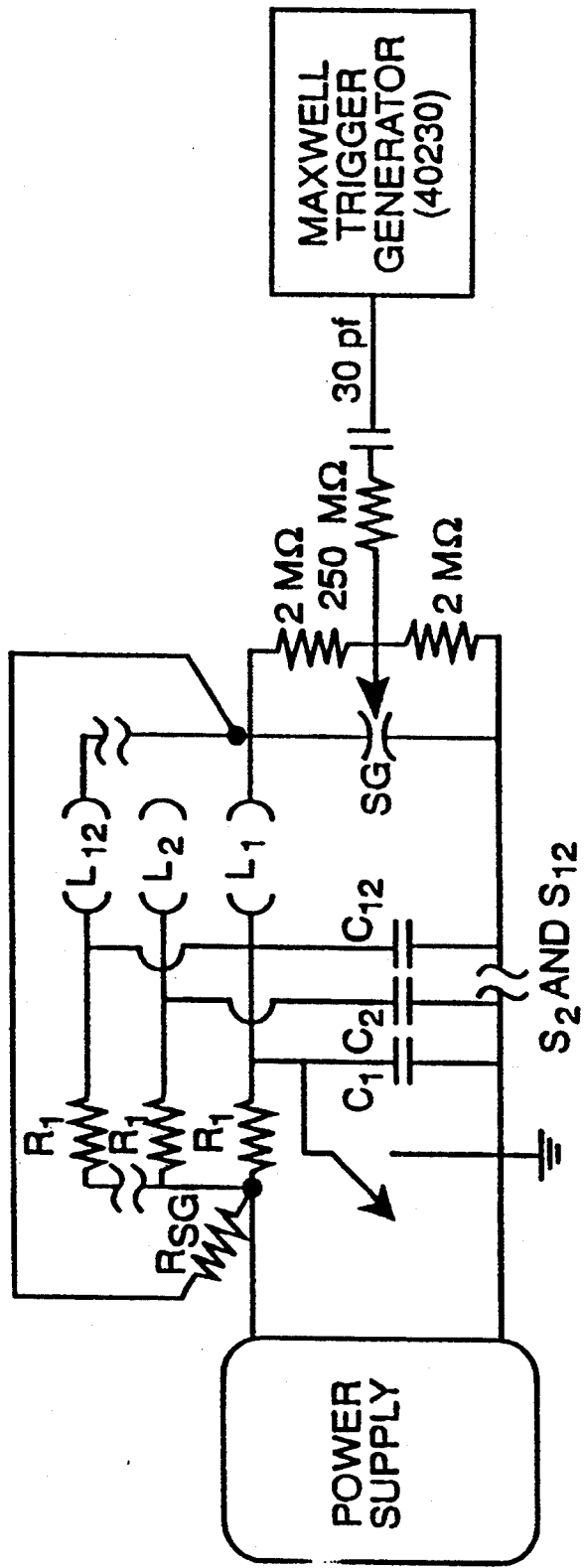
FIG. 8 illustrates the flashlamp pulse circuitry.

The Xe flashlamps used to excite the iodine gain medium were 1 cm i.d., 1 mm or 2 mm wall thickness, quartz tubes filled with 150 torr of pure xenon gas and acquired from ILC Corp. Each flashlamps was excited with separate 3.6-3.8 f capacitors charged to 15-30 KV and switched with a single, modified Maxwell spark gap (SG), M/N 40359 shown in FIG. 8. Each of these capacitors were connected to a high voltage, normally closed, remote controlled shorting switch connected to the safety interlock of the A.L.E. Systems, Inc. power supply M/N 302L "master" and five M/N 302S "slaves". Another remote controlled high voltage, normally closed switch, Jenning switch was also used to insure the no high voltage from the power supply could accidentally be initiated. This type of power supply operates readily at the new increased repetition rate of 10 Hz with the incorporation of higher-current charging supplies. More advanced, higher performance power supply designs involving higher energy storage density capacitors, and pulse transformers which enable lower switching voltages, have been demonstrated. Advanced supplies occupy substantially less volume and have demonstrated ultra-long, reliable operation under stressing conditions. These designs have been reviewed and are suitable for the 10 Hz laser if required.

Figure 9C:
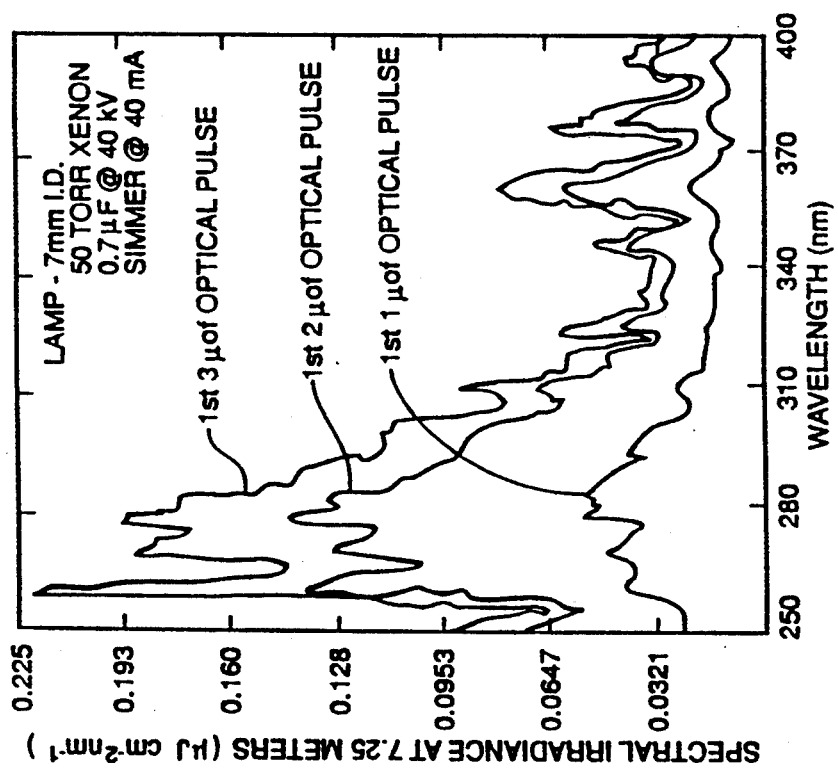
FIGS. 9(a) to (c) illustrate the pertinent physics of flashlamps and the coupling of energy to the iodine gain medium.
Figure 9A:
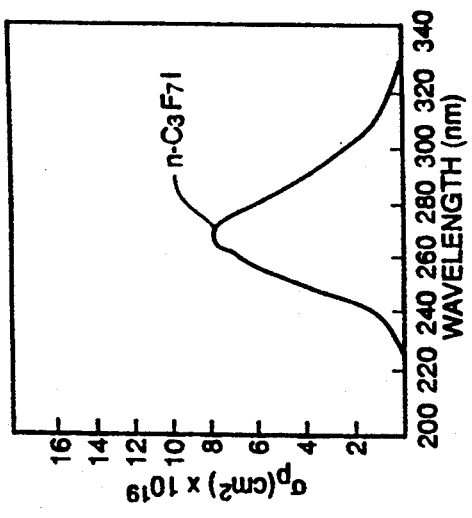
Figure 9B:
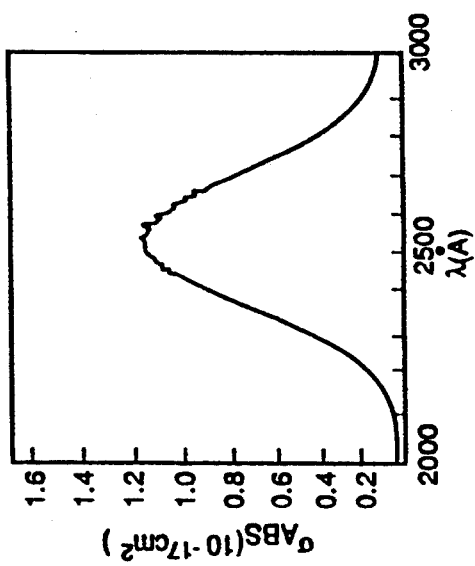

Since one of the intents of this study was to acquire short pulsewidths near 10 μsec, it was necessary to excite the flashlamps at very high power levels in excess of 300 MW with peak plasmas deposited energies greater than 1.7 Kjoules. At these high deposited energies in such short times, however, the flashlamp lifetime (shots before destructively failing) become quite short. In addition, the intense UV radiation produced significant ozone ($O_3$) in the region near the flashlamps. $O_3$ absorption very closely overlaps the $C_3F_7I$ photolytic absorption bans as seen by comparing FIGS. 9(a) and (b). The formation of most of the ozone occurs after the flashlamp pulse and thus air convection was necessary. Water cooling, however, is believed to fulfill two roles, removal of excess plasma thermal heating and "absorption" of flashlamp vibration resultant from the high loading induced plasma shock waves. A calculation on the operating parameters of such flashlamps with these very high power/energy loadings provides valuable insight into the requirements of liquid water cooling. Using established techniques to characterize flashlamps, the following two relations must be used:

$$Life(flashes) = (E_0/E_x)^{-8.5}; E_x = 14202\, S\, dT^{\frac{1}{2}}$$

where $E_0$, $E_x$, T, d and S are respectively the lamp deposited discharge energy (Joules), the explosion energy (Joules), the time constant of the electrical lamp circuit (equals $\frac{1}{3}$ the pulse duration—seconds—defined by $T=(LC)^{-1}$), the lamp bore diameter (cm), and the lamp length (cm). The lamp lifetime is defined as the average number of pulses to 70% of the original UV output. The first relation between the lamp life and ($E_0/E_x$), respectively, have values of (0.58)10$^2$, (0.44)10$^3$, (0.34)10$^4$, (0.26)10$^5$, and (0.197)10$^6$ indicating that the larger the ratio of lamp discharge energy to the lamps's explosion energy, the less the number of flashes the lamp, can sustain before failing catastrophically. Referring to the flashlamp geometry of FIG. 7(a), d=1 mm and S=80 cm. For a pulsewidth of approximately 12 μsec, T=4 μsec and thus the lamp's explosion energy becomes $E_x$=2.27 Kjoules. $E_x/E_0$) equal to 0.75. From the above lamp life versus ($E_x/E_0$), the lamp should last less than 100 shots. For repetitive operation, such condition is unacceptable. Consequently, water cooling of the flashlamps is recommended.

In the water cooling shown in FIG. 7, deionized water with a resistivity greater than 10 MΩ was necessary in order to eliminate any photodeposition of a metal film on the flashlamp outer walls. Obviously such depositions greatly decreased the laser output. A Neslab CFT-75 cooler was used to circulate the deionized water through the water jackets at approximately 1.5 gallons/minute. To minimize to condensation of the $I_2$ molecular photolytic by-product, the water was retained at a slightly higher than ambient temperature, 30°–35° C. This water flow rate did not produce any other mechanical vibrations causing decreased optical quality of the laser output beam quality. To the non-cavity side of the flashlamps, a reflector was placed to reflect UV radiation into the iodine gain region. Small enhancements were observed. Different types of surfaces were placed on these flats with polishing appearing to be the best. FIG. 10 shows the UV reflectivity differences between two types of aluminum finishes, "freshly" deposited and polished aluminum. Although there is significant differences, the fairly quick oxidation of "freshly" deposited Al films change to that of FIG. 10(b). Special coatings were used but most of them would not be able to withstand the extremely high UV intensity generated by the flashlamps. Coatings with a $SiO_2$ overcoating seem to work quite well.

In this section, the systems used to generate an impurity free $C_3F_7I$ gas at required pressures and constant high flow velocity is described. Previously, a completely passive closed-cycle flowing alkyl-iodide ($C_3F_7I$) gaseous supply system provided a high purity and fixed pressure of gaseous $C_3F_7I$ at a slow flow velocity (1–2 m/s). This system was used to operate a cw photolytic atomic iodine laser with virtually unlimited operating time. Its employment produced an extreme cost saving and the generated flowing gas could easily be coupled with either cw or pulsed atomic iodine photolysis lasers to produce excellent results. Although this passive system performed very well with cw atomic iodine lasers, much higher flow velocity is required for repetitively pulsed iodine lasers. To fulfill this requirement, a scaled-up version of the iodine ($I_2$) removal system similar to above was coupled with a turbo-molecular blower, FIG. 6(b), developed for the 0.5 Hz system. Although this turbo-blower system 46 performed extremely well, and gave valuable experience at handling and scrubbing a higher volume of gas at 0.5 Hz, for the 10 Hz 70 J burst-mode laser it was determined that scaling the previous passive system by a large multiple would avoid the volume associated with a high capacity flow loop.

Figure 6:
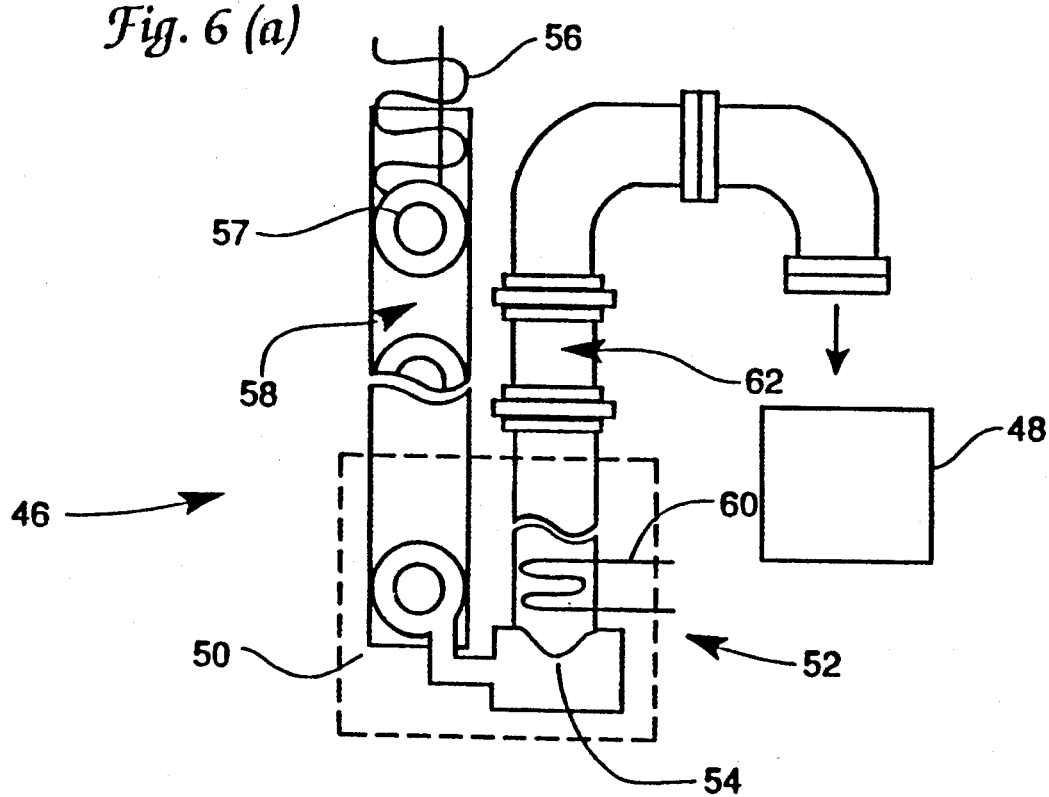
FIGS. 6(a) and (b) illustrate $C_3F_7I$ iodine ($I_2$) removal system with the condenser and evaporator sections and a turbo-molecular blower.
Figure 6:
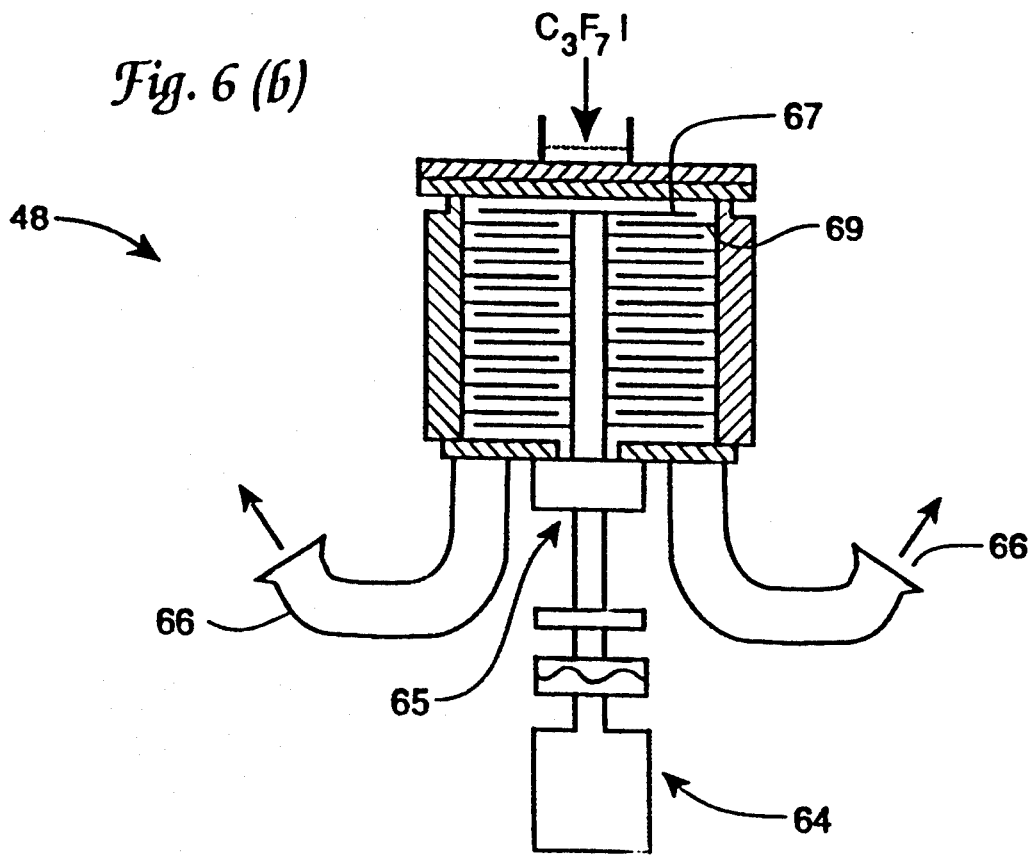

FIGS. 6(a) and (b) show schematics of a low rate, closed-cycle, $C_3F_7I$ iodine ($I_2$) removal system 46 integrated with a turbo-molecular blower 48 to create the large flow velocity. The removal system 46 consists of a condensor 50 and an evaporator 52 cooled to different temperatures and coupled with a stainless steel tube. All components were made of stainless steel to minimize temperature drifts and both the condensor 50 and evaporator 52 were encased in insulated jackets to reduce heat transfer. The quantity of liquid $C_3F_7I$ was sufficient to assure its liquid level was above the orifice connection between these. Approximately 1 Kg of $C_3F_7I$ was required and sustained reliable lasing for several weeks. This liquid 34 isolated the two cells and forced gaseous $C_3F_7I$ to flow from the evaporator to the condensation zone via an external path, namely the laser gain cell 12, not shown, even without the blower discussed below. Referring to the left side of FIG. 6(a), (the condensor side), from the top where the iodine gain cell's $C_3F_7I/I_2$ gas "exhaust" enters the iodine ($I_2$) removal system 46, there exists approximately one foot of stainless steel (s.s.), 0.5 inch o.d. tubing, 3" diameter helical coil 56 with 1 turn inch, and 1 foot long. This s.s. tube was welded to a 1" diameter APC flange sealed with an O-ring to the 4" diameter s.s. pipe. Denatured alcohol (95%) cooled to temperatures from −40° to −60° C. by a Neslab model ULT-80 refrigerated circulation bath typically flows through the helical coil 56. Once the $C_3F_7I/I_2$ impinges upon the coil 56, it is liquified along with the $I_2$ being dissolved in the liquid $C_3F_7I$ or solidified on the helical coil. Any solid $I_2$ not dissolved in the liquid $C_3F_7I$ is literally washed off these coils as verified by observing these coils after the pulsed laser was turned off. This liquified $C_3F_7I/I_2$ solution next passes through a fine copper wool, mesh 58. Such Cu wool reacts with the $I_2$ forming CuI. Any $I_2$ still not removed is then deposited as either a solid or dissolved in the liquid $C_3F_7I$. On the right side of FIG. 6(a) is the evaporative region maintained at a temperature greater than the condensor from which clean $C_3F_7I$ is liberated with negligible $I_2$ vapor. This evaporator temperature was established by a 5 inch long s.s. coil 60 similar to that in the condensor section. Again, denatured alcohol controlled by a Neslab cooler LT-50 at temperatures of −30° to −15° C. was used. The remaining $I_2$ vapor is then retained in the liquid $C_3F_7I$ where it is reacted with the Cu wool mesh 62 above the evaporative side of the iodine ($I_2$) removal system. During-operation, the temperature of both the evaporative and condensative baths controls the $C_3F_7I$ pressure in the iodine gain cell.

$C_3F_7I$ gas has unique chemical properties which enables it to operate in a closed cycle flowing systems with relatively easy removal of the photolytic by-product $I_2$. FIG. 11(a) illustrates the vapor pressure for this gas. Typical operating pressures for the pulsed photolytic iodine laser described here are 20–60 torr correlating to temperatures of −35° to −18° C. The vapor pressure versus temperature relation for $C_3F_7I$ is $$\log_{10} p(\text{torr}) = \frac{-1515.2}{T(°K.)} + 7.7138$$

$C_3F_7I$ is a clear liquid, has a freezing point of −78° C., and turns purple with dissolved $I_2$. $I_2$, $H_2O$, and $O_2$ are possible impurities in $C_3F_7I$ which are strong quenchers of the excited iodine atoms. Consequently, their removal is essential. Since temperatures less than zero degrees centigrade are required to produce the required vapor pressures, an examination of the molecular iodine and water vapor pressure curves of FIG. 11(b) show that these species can be removed from the liquid $C_3F_7I$. Water is not soluble in this liquid. Therefore, by merely keeping the liquid $C_3F_7I$ at the −35° to −18° C. temperature, clean laser fuel at a fixed pressure can be produced provided the solution does not become saturated. The $C_3F_7I$ used was 99% pure normal $C_3F_7I$ as acquired via the demonstrated synthesis/distillation process. The removal of $O_2$ and $N_2$ dissolved in this alkyl-iodide was accomplished via a $LN_2$ freeze/thaw method described elsewhere. Comparable results could also be obtained by merely evacuating the $C_3F_7I$ saturated vapor through a $LN_2$ trap to remove both the oxygen and nitrogen.

Figure 23:
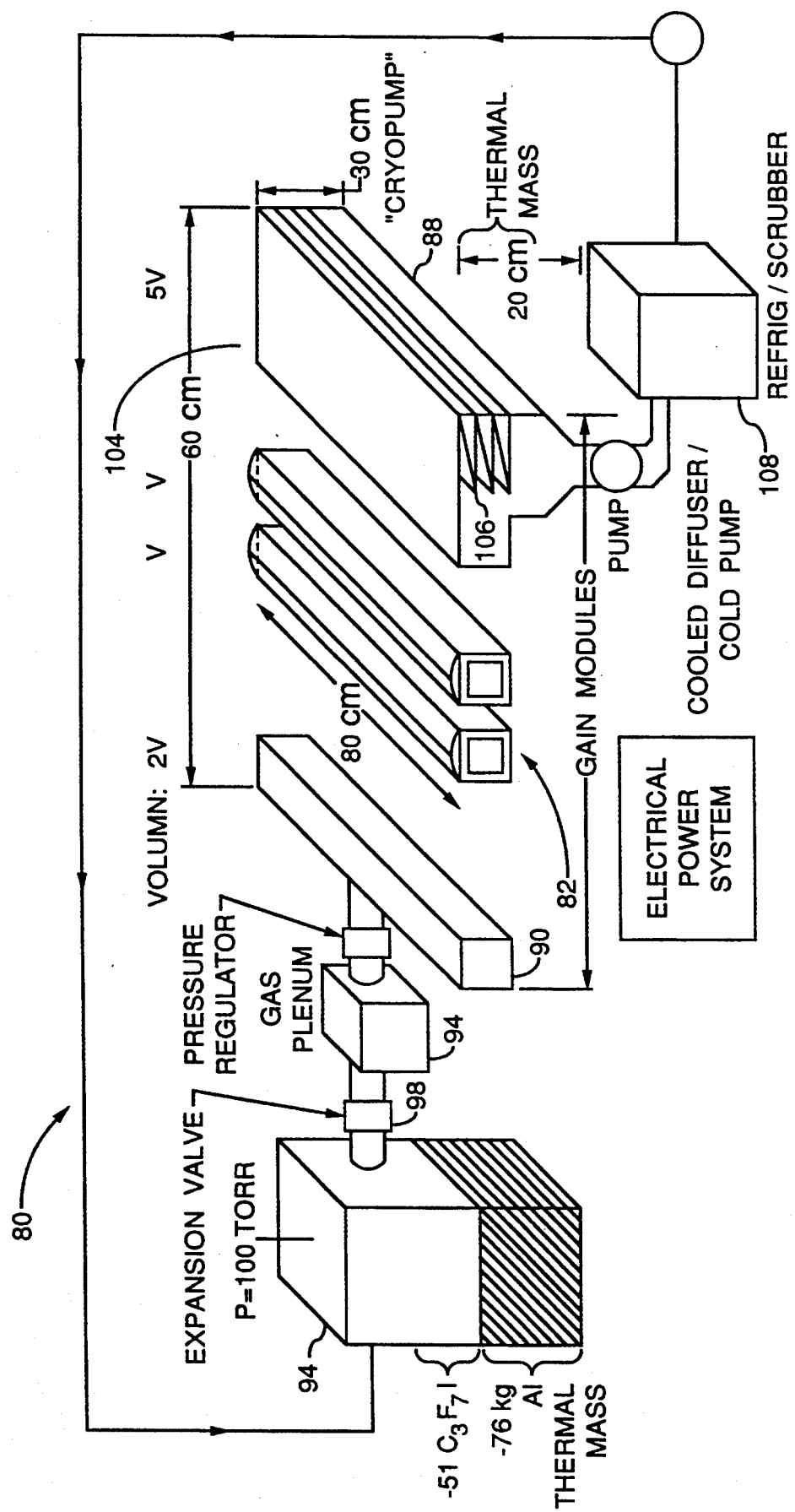
FIG. 23 illustrates a 3-d layout of the flow system shown in FIG. 22, showing approximate element size for scale.

In the high-repetition rate, compact, burst mode, blowdown PIL device 80, FIG. 23, $I_2$, $H_2O$, and $O_2$ must be removed entirely from the fuel if it is to be recycled. $O_2$ and $H_2O$ can be removed from the fuel before initial filling by previously demonstrated methods, there is no source of additional contamination for these substances, so the fuel purification is adequate. Since free iodine is created in the lasing reaction, and re-association with the $C_3F_7I$ parent is not 100%, a copper wool trap is used to filter the condensed fuel before recirculation, making use of the ability of copper to absorb free iodine.

In characterizing the performance of the prior 0.5 Hz pulsed photolytic iodine laser, both stable and unstable resonators were used. With a stable, hemispherical resonator having AR coated flat windows, the Rigrod gain-saturation curves were obtained. From the gain-saturation data obtained with this hemispherical stable resonator, the optimum confocal, unstable resonator magnification will be described hereinafter.

For most large volume laser gain medium having nearly uniform gains and square or circular geometry, the confocal unstable resonator yields a collimated laser output with the fractional output coupling dictated by the magnification. Besides a collimated laser beam, the optics are relatively easy to fabricate. Confocal unstable configured resonators have two types, namely positive and negative branches. The latter produces a focus internal to the mirrors while a positive branch unstable resonator does not. Because of the high internal cavity power present in this iodine gain medium, no internal focus was desired and thus the positive branch mode was chosen. For the positive branch, unstable confocal resonator, the critical parameters are:

$$g_1 = \frac{M+1}{2} ; g_1 = \frac{M+1}{2M} ; R_1 = \frac{L}{1-g_1} ; R_2 = \frac{L}{1-g_2}$$

where $R_1$, $R_2$, M, L, $g_1$ and $g_2$ are respectively, the mirror radius of curvatures, the magnification M $(=|R_2|/|R_1|)$, the mirror distance L $(=|R_1|-|R_2|)$, and resonator g-parameters. The effective Fresnel number is $N_{eq}=N\times(M-1)/(2M^2)$. The geometrical equivalent output coupling $c_G=(M^2-1)/M^2$. In addition, the outer laser beam width, equal to the cavity width w, and the small feedback width a are related by $w=Ma$.

FIG. $I_2$ shows the confocal resonator 68 employed in the 0.5 Hz pulsed photolytic iodine laser along with two distinct changes. First, instead of the conventional scraper to couple laser energy from the resonator 68, transmissive coupling was incorporated. As is common in solid-state Nd lasers at 1.315 microns, the laser mirror substrates can have excellent transmissive properties. Here, BK7 substrates were used. Such low absorption of laser radiation at this wavelength relates to negligible mirror heating and thus no noticeable aberrations to the mirror surface. As FIG. $I_2$ shows the feedback mirror 70 is a meniscus mirror; i.e., having different radii of curvature on the front and back surface. The front surface 72 (meaning looking at it from inside the cavity) is convex as is the back mirror surface. On its front surface was placed an AR coating at 1.315 microns following by a square, maximum reflecting coating at 1.315 microns. This square reflective coating was centered on the square $7.6\times7.6$ cm$^2$ iodine gain cell and had a width w such that the relation Ma=7.6 cm was satisfied as dictated by the above condition. Rigrod gain-saturation data shows that approximately 90% output coupling is optimum corresponding to a magnification M=3. Dictated by the gain cell, mirror bellows 74, and polarizing turning flat 76 described below, the mirror spacing was required to be 2.85 meters. From the above confocal resonator relations, the two mirror radius of curvatures become −2.73 and 8.41 meters with a square feedback width of 2.35 cm. The exact magnification was 3.08.

On the back side of the meniscus mirror, the radius of curvature was −2.78 meters. This different radius of curvature accounted for the refractive index bending of the laser radiation as it propagated through the BK7 substrate. Including this different curvature on the back surface assured the laser output beam was collimated. To minimize any reflections from this surface, an AR coating was deposited. On the opposite end of the resonator was the 45° angle reflecting flat 76 coated for maximum reflectivity of p-polarized radiation and less than 10% for s-polarization. For round trip propagation, only p-polarized laser output was produced as shown in the next section. This last operation was necessary since an unstable resonator with no internal Brewster windows or turning flats have no polarization selectivity. The p-polarization coating on this flat mirror assured very good control. The folding optics which couple the radiation between the two side-by-side cavities in the burst-mode device are coated similarly for polarization selection.

Figure 13:
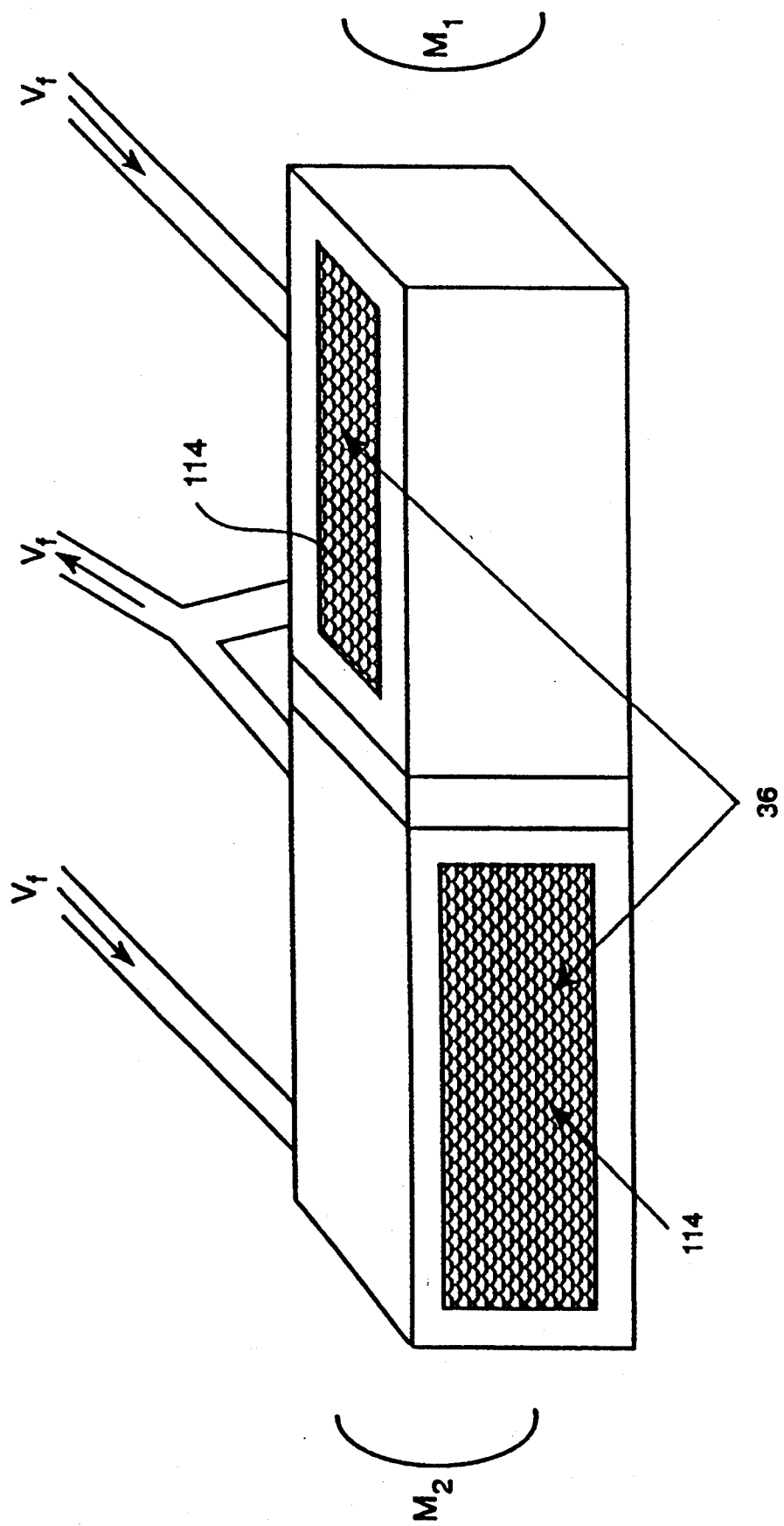
FIG. 13 illustrates by schematic a method used to provide parasitic control for the high gain, pulsed photolyric iodine laser.

Because of the very large gain-length products, $g_oL$, established in the iodine gain medium, much effort was required in the 0.5 Hz device to eliminate parasitic oscillations. Even with 100% outcoupling from one mirror of a hemispherical resonator, very significant, multi-mode laser output existed. Consequently, both of the AR coated windows had to be eliminated requiring all the optics to be internally mounted. The low angle reflections from the gain cavity Al walls and UV transmitting walls established parasitic modes. FIG. 13 shows the approaches taken to eliminate these parasitic oscillations. First, all the gain cell internal walls were roughed with large 10 mesh $Al_2O_3$ fragments giving a 80-100 mesh surface texture. Next, the UV windows had a aluminum hexagon "fence" having a height of 50 mils and thickness of 10 mils. The optical "fence" prevented any low angle reflection from the windows. The transmission of UV radiation through this optical "fence" was greater than 98%. Both of these techniques successfully eliminated additional parasitics. As shown, only the lowest mode of the confocal unstable resonator was observed.

Detailed data is now presented on the stable and unstable resonator operation of the 0.5 Hz, 70 J photolytically excited atomic iodine laser at 1.315 microns to establish the fundamentals for high-energy pulsed photolytic lasers. In addition, the optical properties like beam quality, coherence length, and polarization are presented.

To use the unstable resonator for optimum extraction of the energy from the photolytic excited atomic iodine gain medium, a Rigrod gain-saturation curve was obtained. This curve was particularly important since the self-terminating nature of the iodine transition makes it very difficult to predict the saturation intensity. Using a hemispherical stable resonator with the 10 meter radius of curvature, maximum reflectivity at 1.315 microns and an 80% transmitting flat, the laser energy was determined for different $C_3F_7I$ pressures as shown in FIG. 13. The maximum laser energy was obtained near 60 torr with a small change as this pressure varies from 30 to 60 torr. Later results will show that optimum unstable resonator operation occurs when 30-45 torr of $C_3F_7I$ exists in the photolytic iodine laser medium. Using the relations cited above between the geometrical coupling $c_G$ and the magnification of the unstable resonator, the 90% outcoupling corresponds to a magnification of 3. The unstable resonator of FIG. 12 was then dictated by the known length between the mirrors, 2.84 meters.

Figure 17:
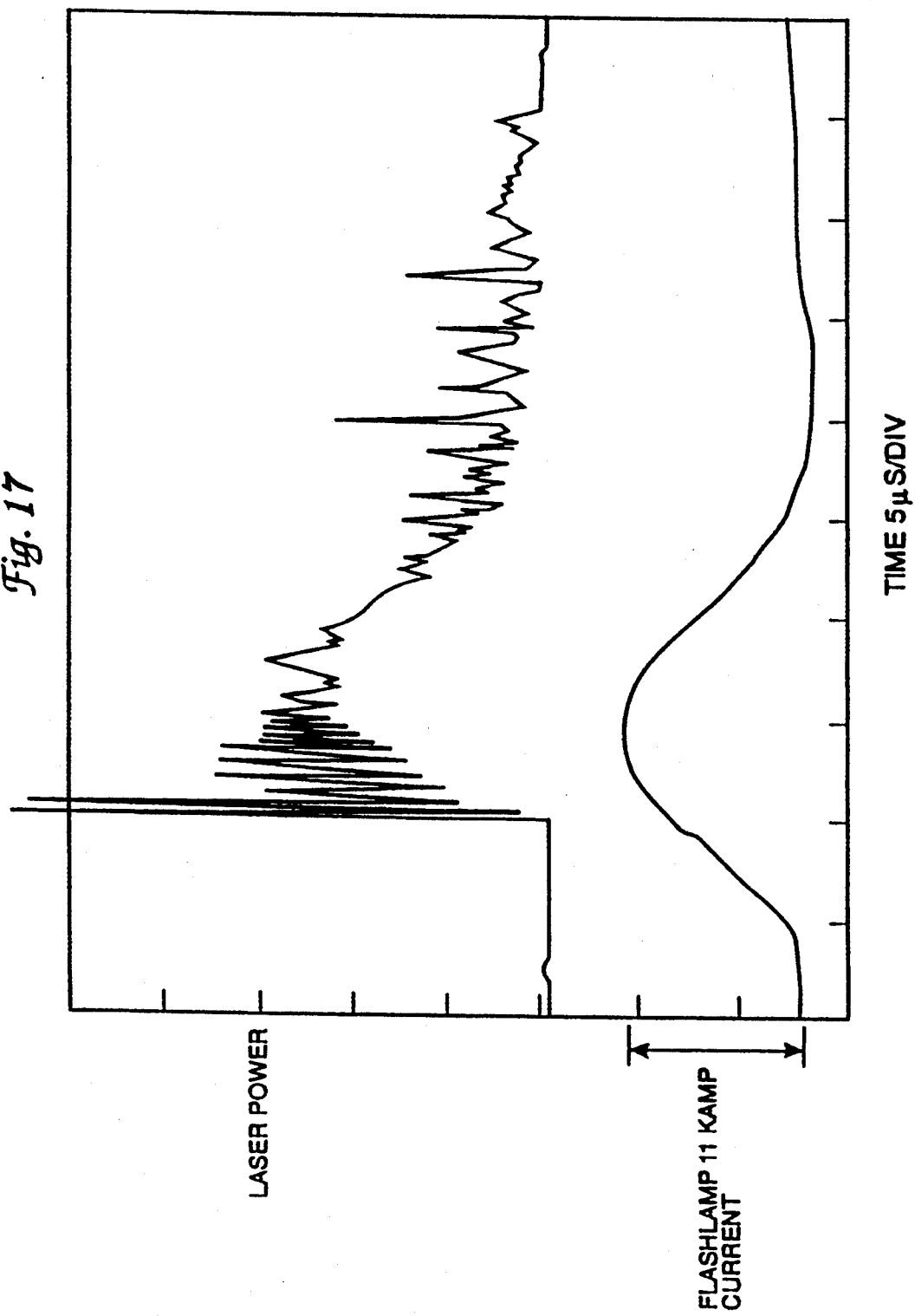
FIG. 17 illustrates a comparison of the transient behavior of flashlamp current and laser signal for M=3 confocal unstable resonator as shown in FIG. 13 and characterized in FIG. 21.

FIG. 17 shows the extracted energy from this M=3 unstable resonator versus the C₃F₇I pressure showing that optimum pressure operation is approximately 30 to 45 torr. This behavior was similar for each of the three capacitor energies examined. FIG. 17 shows the resultant pulseshape relative to the flashlamp current transient behavior illustrating a delay of 3–4 μsec before the onset of the laser pulse.

Figure 18A:
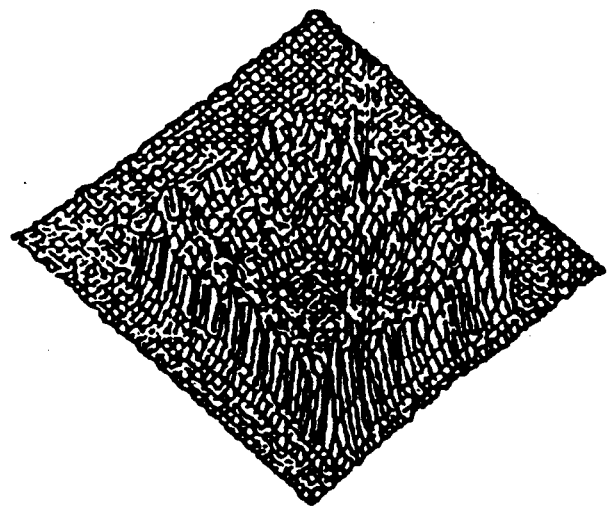
FIGS. 18a and 18b illustrate the near and far-field laser beam profile with an unstable resonator of magnification M=3 of FIG. 13.
Figure 18B:
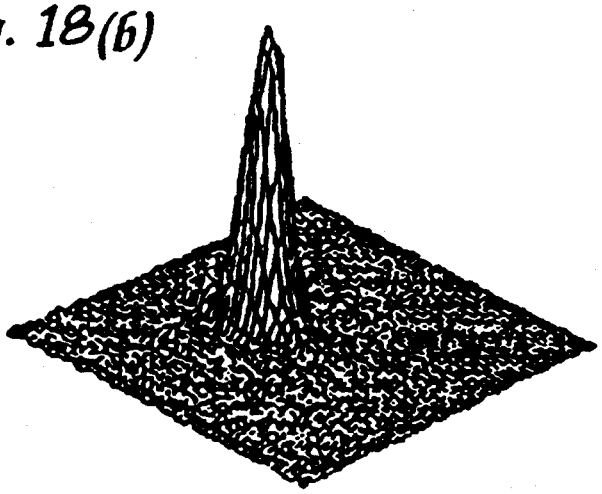
Figure 19:
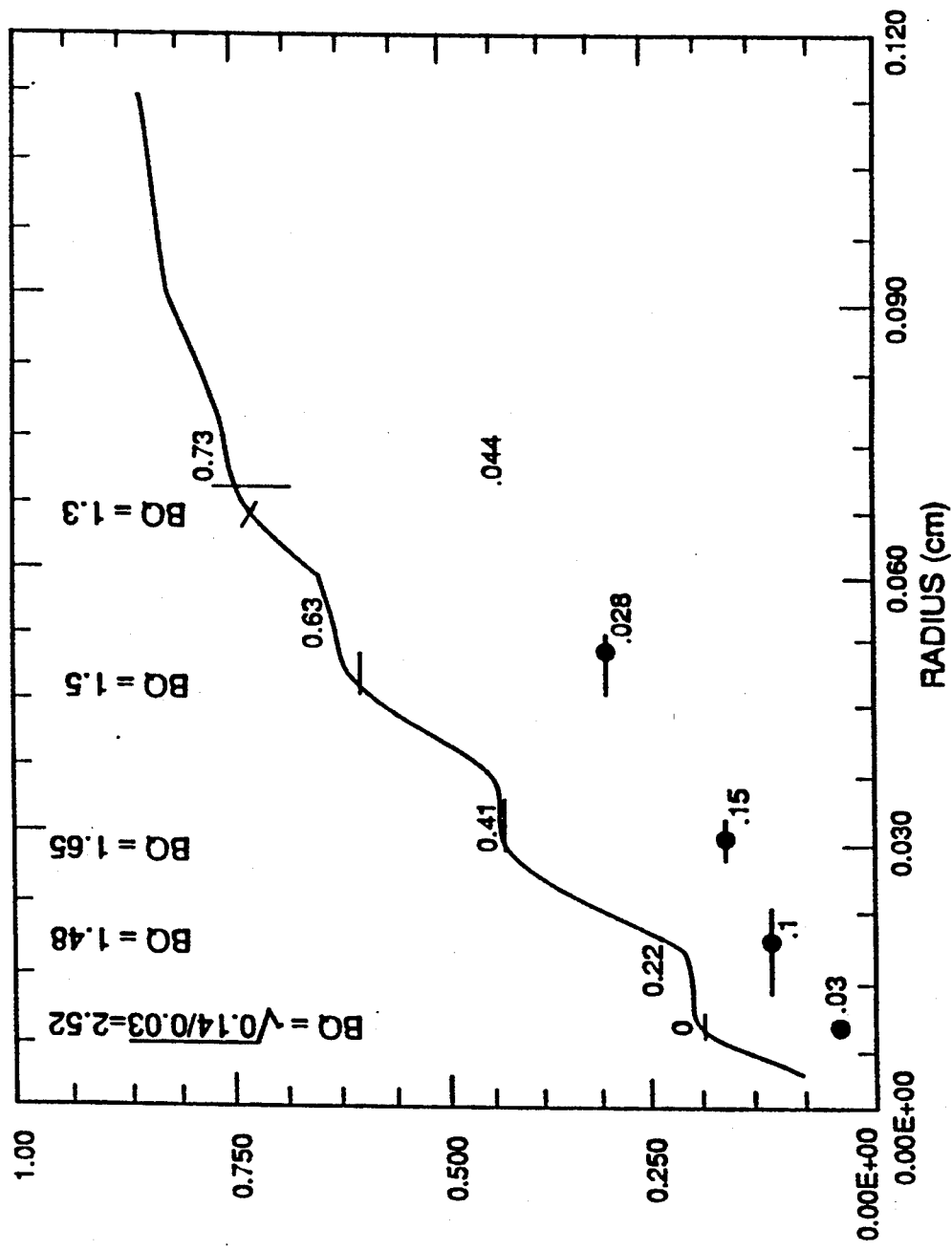
FIG. 19 illustrates the ratio of integrated theoretical intensity and experimental intensity profiles versus radial distance from center of laser beam in the far-field (focal plane) for the M=3 unstable resonator of FIGS. 13, 19-21.
Figure 20A:
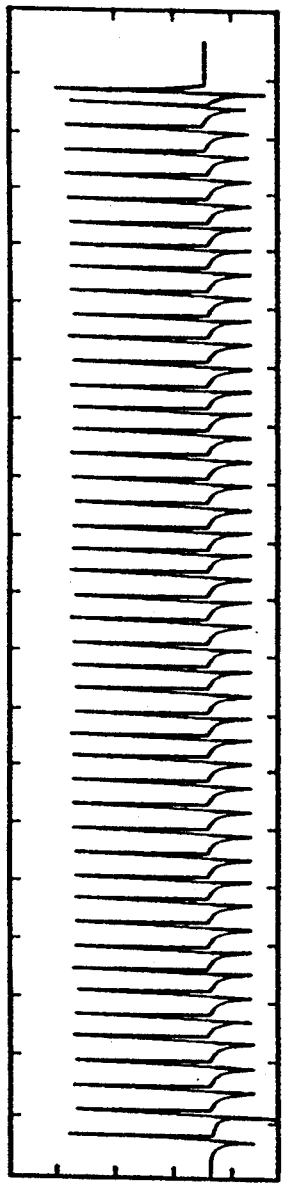
FIGS. 20(a) to (c) illustrate results of laser pulse energy and average power measurement for the pulsed photolyric atomic iodine laser. Results for a single gain cell of 75 cm. length with 8 lamps charged to 25 Hz where the repetition rate is 0.5 Hz.
Figure 20B:
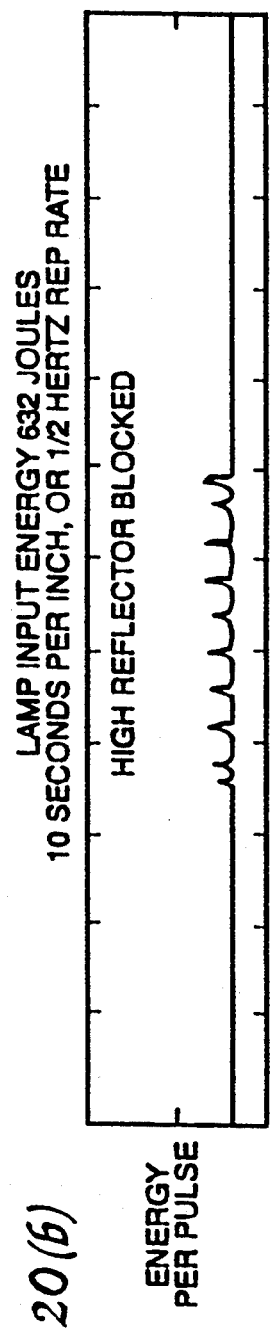
Figure 20C:
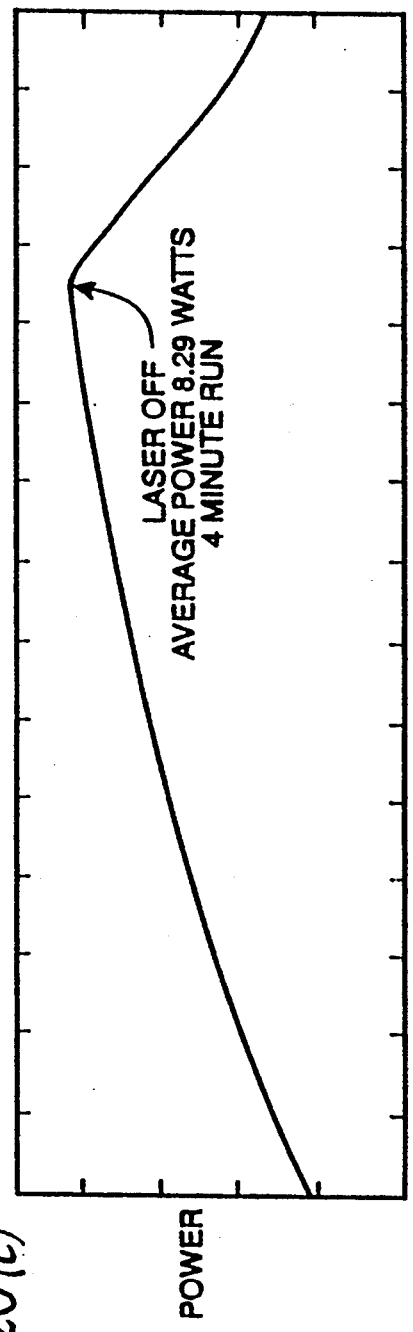

FIG. 18 shows the near-and-far-field laser beam profiles using this unstable resonator. The near-field data of FIG. 18(a) indicates a nearly flat profile with the square hole absence due to the feedback part. The far-field data of FIG. 18(b) illustrates the very strong central lobe and very low intensity of the side lobes. Analyzing this far-field data as function of its radial distance from the center, the beam quality of the laser beam can be determined. FIG. 19 shows the result of such analysis on the far-field beam profile of FIG. 18(b). That the experiment data is quite close to the theoretical predictions for this unstable resonator is an indication of good beam quality. The BQ is give by the relation $$BQ = [I_0(r=0)/I(r=0)]^{\frac{1}{2}}$$

where $I_0(O)$ and $I(0)$ are respectively the theoretical and experimental intensity magnitudes. Performing such analysis on the data of FIG. 18(b) at several different radial position of the give a BQ of 1.4 times diffraction limited. FIG. 20 shows the energy stability of the laser during an extended run. During the time repetitive energy measurements were being made, the laser beam Jittered less than 1 microradian.

In summary, the technology of pulsed, photolytic iodine lasers at 1.315 micron has demonstrated remarkable performance by using a 3 magnification, unstable confocal resonator to extract a large fraction of the lowest order mode. Optical diagnostics of the laser beam relates its excellent beam quality less than 1.5 times diffraction limit, good collimation and polarization extinction, plus a coherence length greater than 45 meters. Using the iodine (I₂) removal, long and reliable operation of this 0.5 Hz laser device was obtainned. The cost to operate this device was quite low since the C₃F₇I laser fuel requirement is low, approximately 2–4 Kg per month. These type of photolytic iodine lasers provide safe, reliable, compact, high power laser performance at 1.315 microns unlike the chemical version of oxygen-iodine lasers. In addition, their reliable operation, low fabrication and operating costs, and excellent beam quality makes them a very useful source of high energy, high power one micron radiation. Provided that the media quality features described above are maintained the transition from longitudinal flow to transverse flow can, by way of the approach to be described in the next section, involve no other changes which would effect the excellent performance of the existing device.

The Compact, Burst Mode, PIL Device

Based on the demonstrated low-repetition rate 70 J PIL, described in the previous section, the requirements for a high repetition rate, transverse-flow device 80 are now established. The requirements fall into categories: flow duration, volume, pressure, velocity, and uniformity. Table VI describes the

TABLE VI

| | |
|---|---|
| Gain Volume | 10 l |
| Clearing Ratio (Flush Factor) | 2 |
| Cavity Pressure | 35 torr |
| Laser Rep Rate | 10 Hz |
| Run Time (Per Burst) | 20 sec |
| Startup/Shutdown Times | Less than 1 sec |
| Pulse Energy | 70 J | laser specifications for the desired high rep rate, burst mode device 80. The laser repetition rate and run time are chosen to be suitable for a number of non-laboratory applications. These applications require that the laser be available in 1 second response time. The gain volume (and gain cell geometry) is chosen to be identical to the already-demonstrated longitudinal device. The flow rate must insure that the gain volume is completely exchanged before each laser pulse. Previous experience has demonstrated that a design which exchanges the gas in a laser cavity twice between shots (clearing factor 2) will conservatively insure good laser operation. The cavity pressure is chosen to be the same (30–45 torr) as in the previous 70 J device.

For flow system design purposes, the UV flashlamp-induced reaction of the laser fuel can be though of as producing an instantaneous rise of the gas temperature and/or pressure inside the cavity volume while the gas density there is held constant. Using the fuel "burn" of 1% of, for example, 40 torr of C₃F₇I, and using the heat induced per molecule of 1–3 eV, the induced energy change is 5 J/Liter, with a pressure change of 10%. The resulting over pressure in the laser cavity is relieved through the propagation of compressive acoustic waves into the rest of the flow system that is accessible and not blocked by some flow choking element. The acoustic spectrum of these acoustic waves is approximately sinc-like in the wave number. Thus all acoustic frequencies are present from the very low represented by overall pulse repetition rate to the very high represented by the steepness of the ultraviolet pump light spatial cutoff. The most critical acoustic control is associated with the lowest frequencies and longest acoustic wavelengths. Proper limitation of the magnitude of these acoustic disturbances at the time of the laser pulses insures low associated Δp/p variations, according to the criteria discussed above, insuring good laser gain media optical quality and thus good device beam quality.

A small-scale CW C₃F₇I transverse-flow device was constructed previously at this laboratory. Based on experience with this device and scaling demonstrations with other lasers, subsonic flow is desired to avoid shock formation and a new source of associated acoustic density variations in the laser gain media which would make it difficult to achieve good beam quality. Table VII shows the calculated speed of sound in

TABLE VII

| | |
|---|---|
| Molecular Mass | 0.269 kg/mole |
| Density (Liquid) | 2.106 kg/l |
| (Gas-30 torr) | 5.22 × 10⁻⁴ kg/l |
| Heat of Vaporization | 24.3 × 10³ J/mole |
| Vapor pressure @ | |
| 25° C. | 0.4 atm |
| −30° C. | 30 torr |
| 10° C. | 1 atm |
| Freezing Temperature | −76° C. |
| Speed of Sound in C₃F₇I @ 30 torr, 0° C. | ~160 m/sec |

$C_3F_7I$ as well as other physical properties of the fuel which will be discussed later. Two geometries have been considered for arranging the two laser gain cavities: the cavities can be arranged in series with the flow, or they could be arranged parallel to each other, resulting in twice the flow area. The series geometry is most simple for the applications at hand, because, as will be described later, the flashlamps which pump the gain media can be oriented in the same geometry used in the earlier 70 J device. The parallel geometry may be desirable if dramatically higher repetition rates were required. Calculations show that the series geometry can sustain sufficient gas exchange rate up to approximately 300 Hz operation before gas velocity approaches the speed of sound.

Figure 3:
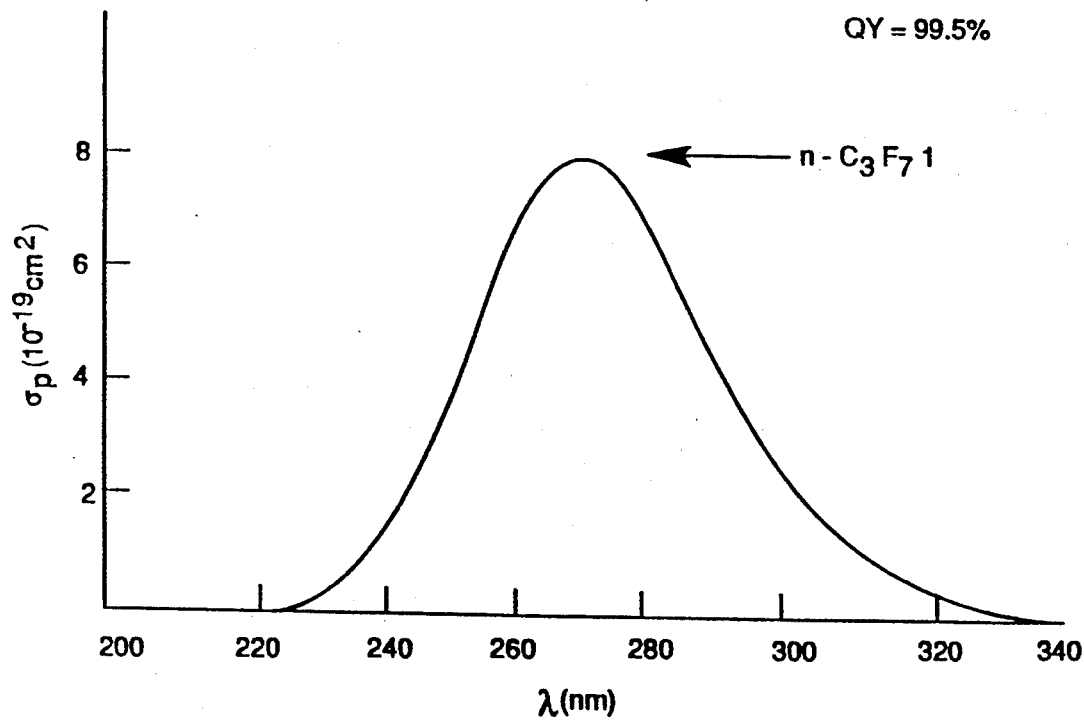
FIG. 3 illustrates the $C_3F_7I$ photolytic excitation cross section.
Figure 4D:
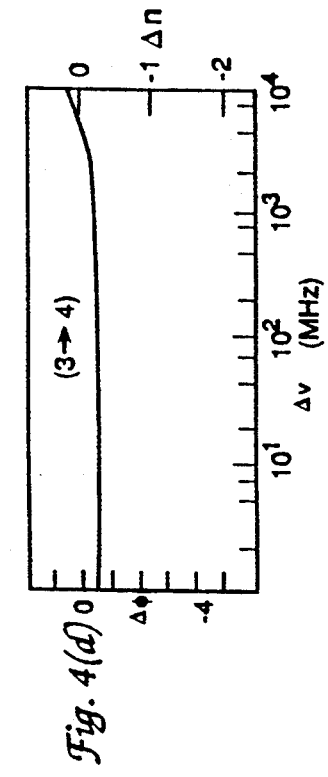
FIGS. 4(a) to (f) illustrate the anomalous dispersion effect on the various hyperfine transitions in atomic iodine versus the pressure broadening for different hyperfine transitions as denoted in the parenthesis (F'→F'').
Figure 4E:
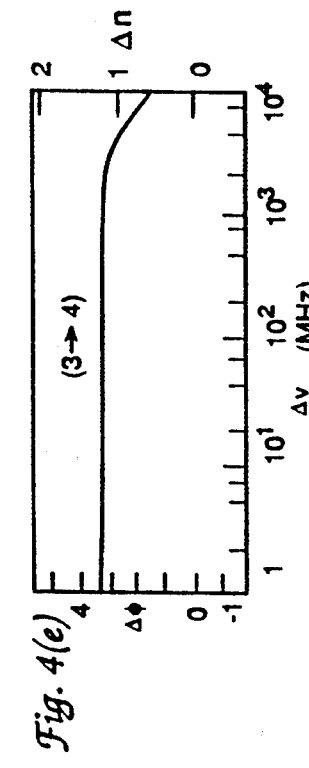
Figure 4F:
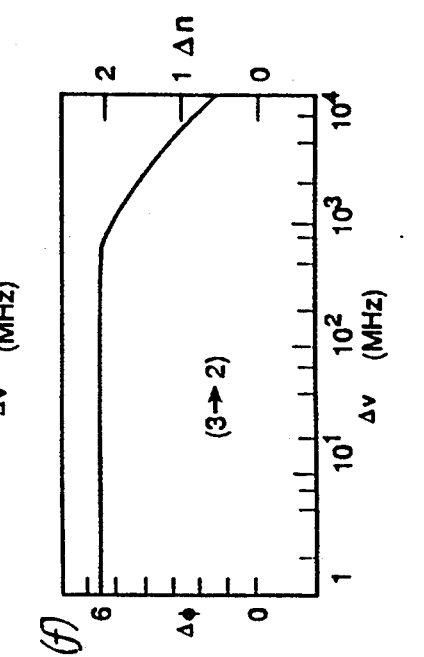
Figure 4A:
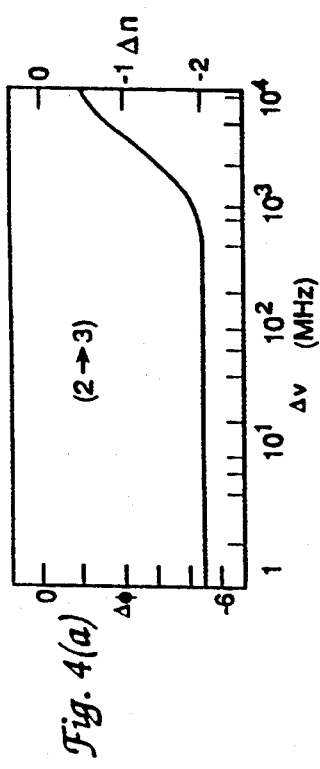
Figure 4B:
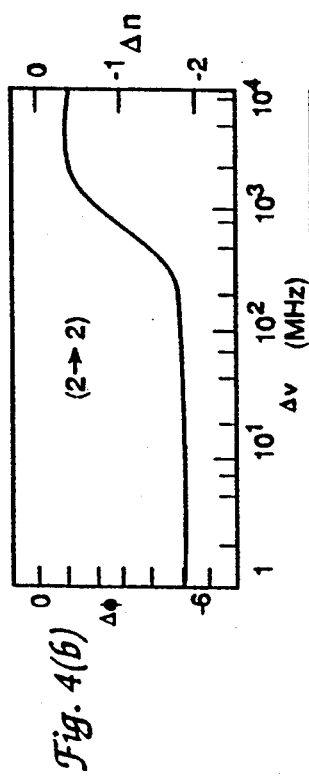
Figure 4C:
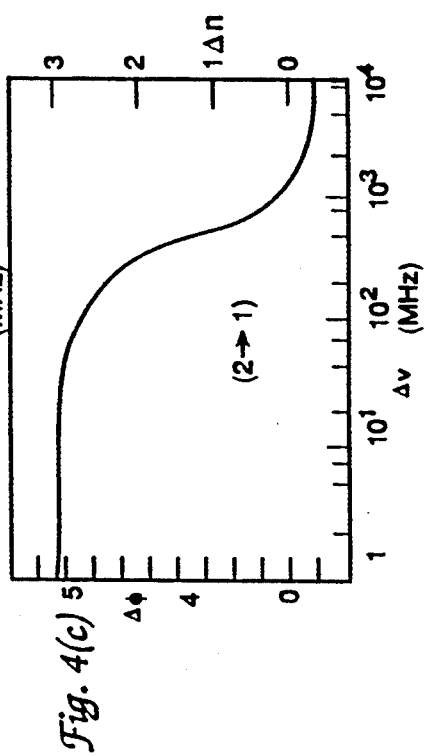

The basic requirement for laser gain in this type of laser is a source of UV photons within the spectral absorption band of the laser fuel—in this case $C_3F_7I$ (see FIG. 3.) Although the high rep rate laser design discussed in the following section assumes the UV light is obtained from electrically pulsed flashlamps made of quartz and containing Xenon, the laser concept is not restricted to this means of UV pumping. Other promising approaches for generating intense pulsed UV include: 1) pulsed electrical surface discharge, in a gaseous atmosphere, with a number of possible choices of the working gas or gas mixture; 2) Explosive flashlamps; 3) Magneto-compressed discharges, 4) laser-produced surface or gaseous plasmas; and 5) pulsed RF discharges. The common element in all of these approaches is a "flashlamp" media in which energy is deposited so that it is heated to make a plasma of a temperature T for which kT (k being the Botzman constant) is comparable to $hc/\lambda_{uv}=E_{photon}$, the desired energy of the UV pump photons. There are approaches to coupling any of the above sources of UV light to the laser media flow system described below.

Figure 22:
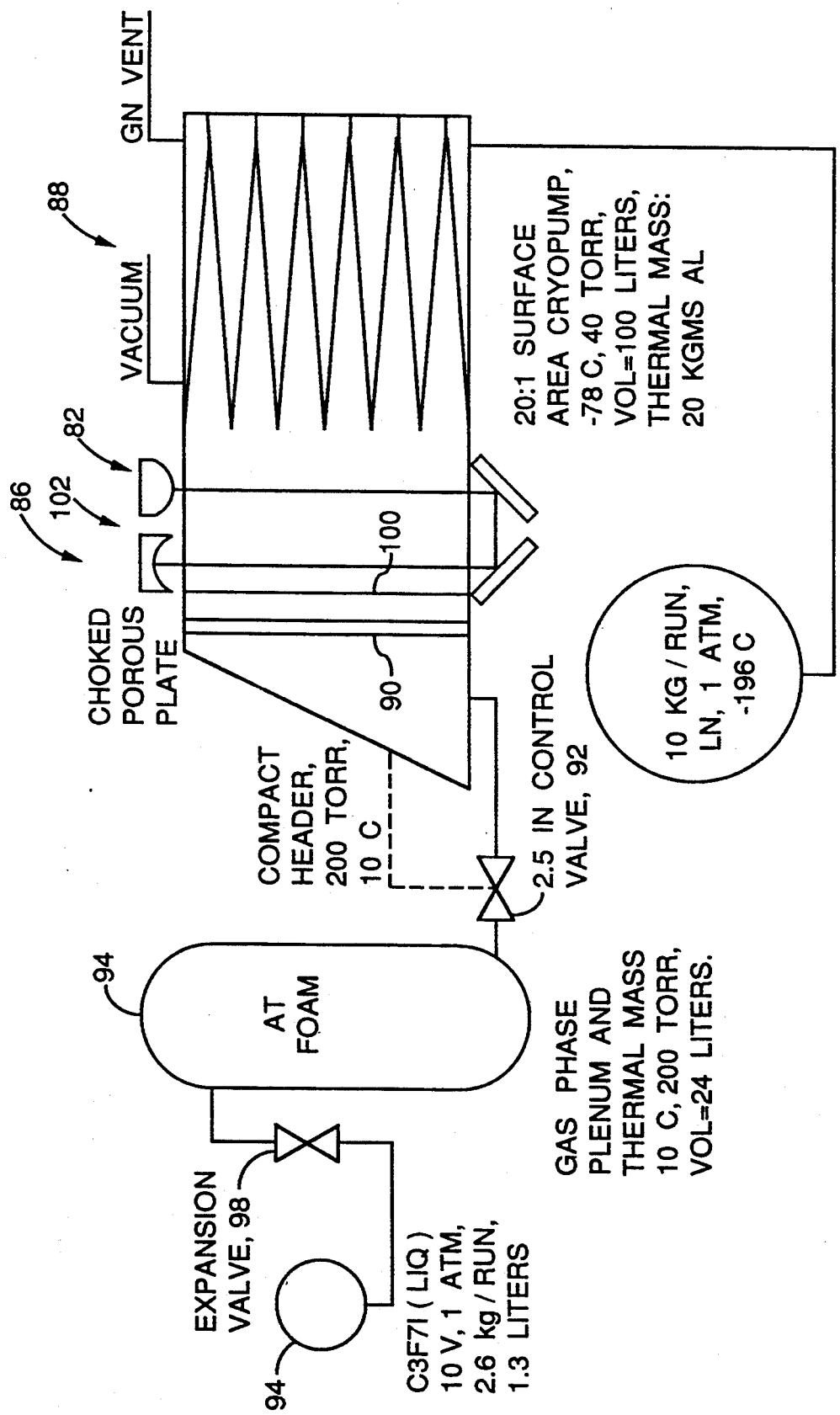
FIG. 22 illustrates a flow system in schematic form.

The FIGS. 21-23 show the flow system requirement and the flow system 86 which was adopted to meet the high-average-power, burst-mode device requirements.

FIG. 21 discloses a pair of parallel gain cells 82 with the laser fuel flowing transverse thereto indicated by the arrow 84. The flow velocity is the product of the pulse rate times the width times the flush rate. The flowrate of the laser fuel is a product of the density, the flow velocity and the area of the flow. An example is noted in the Figure.

FIG. 22 illustrates by schematic the flow system 86 as having a cryopump 88 for generating a liquid from the gaseous flow through the gain cells 82. The liquid laser fuel from container 94 enters into a gas plenum 94. Example numbers are provided.

The compact, burst mode, PIL device 80 is further illustrated by schematic in FIG. 23.

TABLE VIII

| | |
|---|---|
| Flow Linear Velocity (Geometry A) | 320 cm/sec |
| Mach Number | 0.03 |
| Flow Rate | 120 g/sec |
| Total Mass Flow (20 seconds) | 2.4 kg |
| Allowable instantaneous spatial density fluctuations $\Delta\rho/\rho$ | $1.75 \times 10^{-3}$ |
| Allowable gross (slow) temporal density fluctuations | ±30% |

Table VIII shows the specific performance this design achieves. The liquid-gas phase changes at the supply to the laser, and gas-liquid at the cavity exhaust, dramatically reduces system size over closed-loop gas flow systems.

Various concepts were considered for a vacuum pump to absorb the high flow volume required by this design, including mechanical pumps and blowers. However, the thermodynamic properties of $C_3F_7I$ make it feasible to "cryo" pump the device for run times and flow rates significantly higher than required here. Since the cryo-pump has no moving parts and would be highly reliable, that is the adopted approach. Primary challenges are of the nature of insuring the pump rate is sufficiently high enough to sustain the much larger flow volume required (compared to the previous small-scale transverse flow device.) The challenge is in heat transfer, the stream of gas exciting the laser cavity impinges on cold surfaces of the pump, liquefies, and releases the (large) heat of vaporization of $C_3F_7I$ at the surface. The liquid film on the surface grows in thickness until gravity causes it to "run" off. Sufficient heat transfer can be achieved to maintain the desired working pressure of the pump by a) working at the lowest practical pump temperature, and b) providing sufficient pump surface area over which the heat will be transferred and the liquid will be deposited, and c) choosing a geometry for the pump internal design which carries the heat away from the cold surfaces as efficiently as possible. The limit to the minimum operating temperature is set by the freezing point (−76° C.) of $C_3F_7I$; initial temperatures much colder than this would result in formation of a $C_3F_7I$ "ice". The thermal transport properties of solid $C_3F_7I$ are not known but are believed to poor enough that ice formation is to be avoided. Therefore, this freezing temperature was chosen as the design cryopump operating temperature, and the required pump sized was calculated with this assumption.

As described above, the basic gain cavity design from the existing low-repetition rate device is maintained in all respects other than conversion from longitudinal to transverse flow. In the interest of minimizing device total physical volume, a liquid fuel supply approach was analyzed and eventually adopted. In this approach there are no special requirements on the canister material (aluminum is the suggested choice). There is no requirement to maintain the storage containers in a pressurized state and fuel would be liquid at ambient pressure. The fuel is boiled on-demand to feed the laser flow system. The heat of vaporization for boiling is provided by a thermal mass of sufficient heat capacity to insure adequate pressure for the designed burst run time of the laser. Liquid to gas phase change would take place across a standard Joule-Thompson throttling valve 98. There are no special requirements for the expansion (Joule-Thompson process) from ambient pressure at the valve inlet to approximately 200 torr of gas pressure at the valve outlet. This value of the expansion pressure is not particularly critical. It is selected to provide some control range for the flow control valve and to optimize the pressure drop across the porous plate upstream of the laser cavity (which is acoustically reflecting). Table VIII shows the calculated flow parameters needed for 10 Hz operation; these parameters are derived from Table VI requirements and $C_3F_7I$ physical properties, Table VII.

The overall goal of the flow system is to exchange $C_3F_7I$ to the laser cavity at a rate of 2 exchanges per laser shot (flush factor 2) in a manner which meets the requirements given in Tables VI and VIII.

A gas phase plenum filled with a large surface area heat transfer medium would warm the fuel to ambient temperatures. There are no special material requirements. It is suggested that readily available aluminum foam materials be employed. While cavity gas temperature is not critical with the PIL device, it is desirable that there not be large thermal gradients in the gas contained in the laser cavity. This promotes good beam quality. It is only necessary to size the thermal mass of the aluminum foam to be the equivalent of the thermal mass of the several cavity volumes of the $C_3F_7I$ laser fuel.

A flow control valve would be used to reduce the pressure in the triangular plenum/header upstream of the cavity to approximately twice the pressure of the laser cavity. This pressure would be approximately 100 torr, although its value could change depending on the particular choking properties of the acoustic reflecting flow plate 90 material. The control valve would be controlled by a voltage signal generated by a pressure transducer located in the triangular plenum wall. In a more sophisticated control system the control valve would be computer controlled to maintain a constant cavity pressure to optimally match the variable pumping rate achieved by the thermal mass condenser at the downstream end of the laser flow channel.

The object of this component is to provide a compact method of evenly distributing the gas flow across the front of the acoustic reflecting porous plate 90. A uniform distribution of stagnation pressure across the porous plate 90 frontal area is essential to achieving a uniform gas velocity in the laser cavity. It is the uniformly that permits the design of the laser device to a low value of the flush factor. It is well known that triangular or near-triangular distributions of the cross-sectional area optimize the uniformity of the exit flow.

The acoustic reflecting plate isolates the upstream gas delivery system from the acoustic disturbances generated by the flashlamp initiated reactions of the laser fuel in the cavity region. The isolation is in the form of a redirection or reflection of these acoustic disturbances generated by the flashlamp initiated reactions of the laser fuel in the cavity region. The isolation is in the form of a redirection or reflection of these acoustic disturbances from upstream propagating direction into the downstream direction this eliminates the requirement for upstream acoustic absorbers, thus resulting in lower overall system volume. The acoustic reflection takes place because the porous plate is maintained in a choked condition even during the peak of the reflected pressure pulse. Acoustically, the porous plate becomes a velocity node and a pressure antinode. It is critical to this layout that the pressure mode be damped rapidly, for pressure oscillations downstream of the porous plate, are known to produce entropy waves in the gas. The wavelength of entropy waves are reduced from the acoustic wavelength by a factor of 1/M (M-Mach Number). Such waves are extremely important to avoid if small flash factors are to be employed. The porous plate also limits the spreading of the ultraviolet radiation from the flashlamps in the upstream direction. All of the gas located between the porous plate and the upstream edge of the optical volume of the laser cavity must be considered as used and flushed prior to the next pulse. The flushing process must therefore clear this extra tail of heated gas before flush fluid can begin to fill the laser cavity. It is quite important that the porous plate be located as close to the optical volume of the laser cavity as practical within the constraints of the mechanical assembly and the decay requirements of turbulence generated by the passage of the flow through the plate and subsequent exiting from the plate.

Acoustic absorbers 100 should be located as close to the laser cavity 102 as possible. In FIG. 22 labyrinth absorbers 100 contain flow passages through the absorber material. This allows the gas flow to pass through the absorber regions while the acoustic disturbances are damped. Acoustic impedance of the wedge shaped blocks must be selected to minimize reflection of the downstream propagation disturbances back into the upstream direction. The overall attenuation coefficient must be chosen such that a round trip pass (one downstream propagating and one upstream propagating after reflection from the condenser) provides sufficient attenuation that entropy waves generated by interaction of the remaining acoustic amplitude with the porous plate will not generate entropy waves in the laser cavity with density amplitude fluctuations greater than the limit established above for good laser beam quality.

The condenser 104 is sized to accomplish the phase change of the $C_3F_7I$ and molecular and atomic fragments in the spent laser fuel from the gaseous phase into condensed phase consisting of liquid and solid. For reasons of compactness and light weight, use will be made of the inherent thermal mass of the structure. The amount of thermal mass available fromm this source depends on the thermal diffusivity (conductivity) of the material used in the condenser structure. It is recommended that the material again be aluminum. The simplest coolant is liquid nitrogen stored at ambient pressure. Other refrigerants may have certain thermal advantages and may be considered later.

A simple 4-node model was developed to study the pump capacity of a large surface area condenser. The configuration selected consists of metal wedges 106 protruding in the upstream direction. The flow can be considered to be along the wedges. The first node consists of what might be called the freestream and represents gas at the outer edge of the thermal boundary layer. The second node is located at the inner edge of the thermal boundary layer at the surface of the condensed phase. Heat transfer across the thermal boundary layer is characterized by a conventional heat transfer film coefficient determined by the calculation of a Stanton number. The third node is located at the inner edge of the condensed phase and at the outer edge of the metal structure. Heat transfer between nodes two and three is by steady state conduction through the condensed phase. Since the width of this zone is continually changing as the condensed phase builds up, there is variable resistance in the heat transfer path that leads to a time dependent pumping capacity of the condenser. The width of the zone is determined by the rate of condensation which is found from the molecular impact rate at the inner edge of the molecules that actually condense. The rate of vaporization from the surface must be subtracted from the condensation rate in order to find the overall rate of growth of the condensed zone. The rate of vaporization is found from the principal of detailed balancing at the equilibrium condition for vapor-condensed phase coexistence. The fourth node is located in the metal structure at a depth of one skin thickness determined by the material thermal diffusivity. The model supports the feasibility of developing a wedge-condenser pump with a capacity capable of holding the cavity pressure to within a range of plus or minus thirty percent over a twenty second run.

Figure 24:
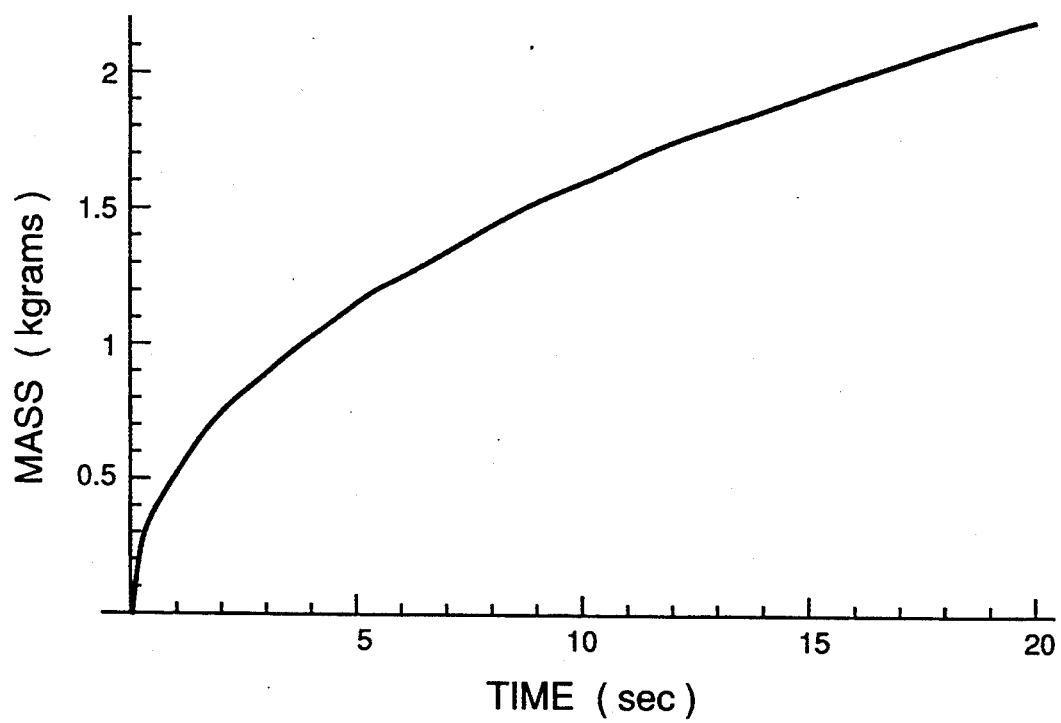
FIG. 24 illustrates output of 4-mode thermal model of condenser/cryogenic pump, for the wedge-shaped geometry shown in the schematic of FIG. 22.

FIG. 24 shows a typical mass condensation history for the system. The case is for a condenser with a surface area equal to twenty (20) times the cross-sectional area of the flow duct. The remaining parameters for this case are:

Condenser surface area/frontal area = 20
Mass flow rate = 0.129 kgms/sec
Molecular Sticking ratio = 0.1
Temperature wall = 195 deg K
Temperature gas = 300 deg K
Average cavity pressure = 40 Torr The vertical axis in the FIG. 24 shows the quantity in kilograms of $C_3F_7I$ that has been condensed while the horizontal axis shows the time in seconds. It is seen that the pumping curve is not linear and that the pump rate is not constant. However at the end of 20 seconds a total mass of $C_3F_7I$ equal to about 2.5 kilograms has been condensed which is the required mass transfer quantity so that the final pressure is equal to the initial pressure of 40 torr. Since the pumping rate always lies above the straight line corresponding to the constant pumping rate, the cavity pressure for this case always lies below the beginning and ending values of 40 torr. This case by no means optimized and is not specifically recommended but is only offered as a demonstration of feasibility and of the flexibility of the PIL system. For this particular example we would expect to delay the onset of actual lasing until the 1 second point in order to avoid lasing during the most serious part of the pressure transient.

The fuel accumulates in a reservoir at the bottom of the cryo-pump during the run time. The liquid can be pumped back to the fuel supply reservoir 94 between bursts for a later operation. Since the re-association of Iodine with its parent molecule has been shown to be very high, the fuel can be recycled for many laser bursts. As described earlier, if copper is used to remove any residual free iodine before the fuel is transferred back to the supply reservoir, the fuel shows no degradation over many use cycles. The limiting time between bursts will be set by the time required to re-cool the refrigerator to the initial operating temperature. If it is required to make this time short, the time can be minimized (~10's of minutes) by incorporating a fine network of cooling channels through the fins in the refrigerator 108.

The choice of material from which to fabricate the flow system of the laser is simplified based on previous experience with $C_3F_7I$ lasers. Aluminum has been shown to be extremely compatible with this laser fuel and with the Iodine vapor created during the laser operation. The heat capacity and thermal conductivity of Aluminum are sufficiently high to make the material suitable for constructing the finned structures in the boiling fuel supply and in cryo-pump. The laser gain cavity with its optical-interfaces (windows) for the UV pump light and the laser radiation are designed in a manner similar to the existing 70 J longitudinal flow device.

For the contemplated non-laboratory operation of this laser device, it is relevant to consider several modes of operation of the burst-mode PIL. Since the required uses is expected to be quite intermittent, a large fraction of its time would be spent in a "storage" mode. In this circumstance, the fuel could be stored at a very low temperature in a reservoir in the cryo-pump. The fuel has been demonstrated to be very stable against decomposition when stored at temperatures below 0° C. The laser would be shifted to a "standby" mode when it is necessary to be ready for one-second notice operation. In this mode, the fuel is transferred to the supply reservoir, and warmed to a temperature near ambient. In this condition, the fuel has sufficient vapor pressure (~300 torr) to easily drive the required cavity flow. The reservoir thermal mass is also at this elevated temperature, resulting in a robust capability to drive the laser flow when required. Finally, in the "operate" mode, the throttle valve is opened to the laser cavity, initiating flow. The pressure drop in the fuel reservoir initiates boiling, and the flow is thus sustained. The cryo-pump has been maintained in its cold condition by the refrigeration system, and thus with its thermal mass is also robustly ready to absorb the fuel flow during laser operation.

Figure 25:
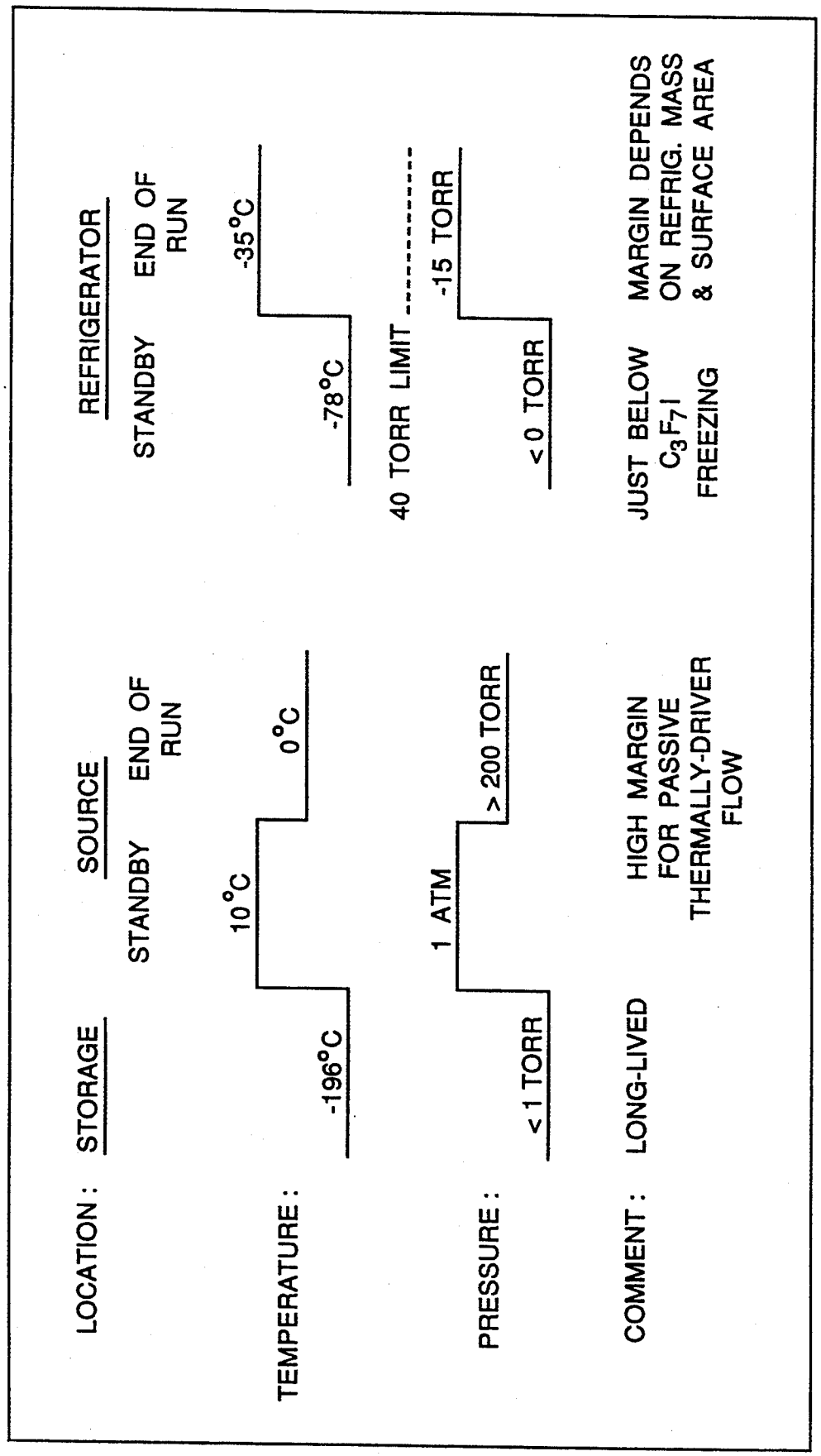
FIG. 25 illustrates temperature and pressure for various laser subelements with mode changes.

The condition of the various portions of the laser are illustrated as the laser cycles through these modes in FIG. 25. The temperature and pressures shown are for illustrative purposes only, and would change based on the specific design of the refrigerator and the capacity of the gas plenums.

The most distinct advantages and new features of this invention are:

(a) a high repetition rate (1-10 and possibly 300-600 Hz) burst-mode photolytic atomic iodine laser capable of operating with excellent optical properties; namely,
  compact size, with no requirement for a large-volume gas circulation system,
  substantial repetition rate (10 Hz analyzed in detail),
  high energies—more than 70 Joules per pulse in unstable resonator,
  excellent beam quality—less than 1.2 times diffraction limited—at the full average power of 700 Watts or higher with higher repetition rate,
  long coherence (greater than 45 meters),
  variable pulsewidth from 5-100's of microseconds,
  low beam jitter—not more than one microradian and good linear polarization (extinction greater than 100:1)

(b) easy/reliable long term operation (c) a means to scale the repetition rate with subsonic flow, wherein acoustic disturbances are minimized (d) a means to generate a large quantity of laser fuel flow, with excellent media optical quality in the laser cavity, from a small total system volume (e) a means to remove the gas from downstream with minimal volume, and minimal acoustic disturbance of the flow Clearly, many modifications and variations of the present invention are possible in light of the above teachings and it is therefore understood, that within the inventive scope of the inventive concept, the invention may be practiced otherwise than specifically claimed.

We claim:

1. A repetitively pulsed, compact, burst mode, blow-down photolytic iodine laser system, said laser system comprising:

a means for selectively and repeatedly providing ultraviolet radiation to a laser gas medium to produce excited atomic iodine;

a fuel system, said fuel system providing an on-demand flow of a laser fuel to form said laser gas medium, said fuel system not requiring an internal blower;

at least one laser gain cell, said laser gain cell having said laser gas medium flowing therethrough, said laser gas medium while therein reacting with said ultraviolet radiation; and a laser resonator, said laser resonator connected to said laser gain cell, said laser resonator outputting a laser beam on-demand.

2. A laser system as defined in claim 1 wherein said means for selectively and repeatedly providing ultraviolet radiation comprises a plurality of flashlamps and at least one current source for driving said flashlamps, said flashlamps being positioned about said at least one gain cell.

3. A laser system as defined in claim 2 wherein said flashlamps are at least positioned on opposing sides of said at least one gain cell to produce uniform gain in said gain cell.

4. A laser system as defined in claim 2 further including means for cooling said flashlamps.

5. A laser system as defined in claim 4 wherein said cooling is provided by flowing liquid with minimization of UV absorption to maximize extractable laser energy.

6. A laser system as defined in claim 2 wherein said current source causes said flashlamps to output about 300 MW, 1.7 Kj, of UV radiation per pulse.

7. A laser system as defined in claim 2 further including reflectors behind said flashlamps.

8. A laser system as defined in claim 7 further including a coating of silicon oxide or $BaSO_4$ high UV reflecting coatings on said reflectors to prevent degradation thereof from UV radiation.

9. A laser system as defined in claim 2 wherein said flashlamps can be pulsed at a rate of at least 1 to 300 Hz.

10. A laser system as defined in claim 1 wherein said fuel system is a blowdown system.

11. A laser system as defined in claim 10 wherein said fuel system comprises:

a liquid fuel supply source;

a means for converting a liquid laser fuel to a gaseous laser fuel, said means for converting providing a sufficient volume and a substantial pressure head of gaseous laser fuel, said means including a expansion valve;

a gas phase plenum, said gas phase plenum heating said sufficient volume to a desired operating temperature;

a means for controlling the input pressure of said gaseous laser fuel into said laser cavity a plenum header, said plenum header receiving said gaseous laser fuel from said means for controlling, said plenum header evenly distributing the flow of said gaseous laser fuel;

an acoustic reflecting porous plate, said porous plate receiving said gaseous laser fuel from said header, said porous plate reducing the acoustic disturbances from reactions in said laser cavity;

acoustic absorbers, said acoustic absorbers damping out disturbances; and a condenser, said condenser converting said gaseous laser fuel to a liquid laser fuel, said condenser including a cryo-pump, said liquid laser fuel being returned to said liquid fuel supply source.

12. A laser system as defined in claim 11 wherein said fuel system is able to transport $C_3F_7I$ in a pressure range of 30 to 60 torr.

13. A laser system as defined in claim 12 wherein said pressure is preferably 30 to 45 Torr.

14. A laser system as defined in claim 11 wherein said laser fuel has contaminants removed.

15. A laser system as defined in claim 14 wherein said contaminants are at least $O_2$, $H_2O$, $I_2$ and $N_2$.

16. A laser system as defined in claim 1 wherein said laser fuel is an alkyl-iodide.

17. A laser system as defined in claim 16 wherein said alkyl-iodide is $C_3F_7I$.

18. A laser system as defined in claim 1 wherein said at least one laser gain cell operates in either a longitudional or transverse mode.

19. A laser system as defined in claim 18 wherein said gain cell is in the transverse mode where said flow can be either subsonic or supersonic.

20. A laser system as defined in claim 19 wherein 2 gain cells are in parallel.

21. A laser system as defined in claim 18 wherein said laser gain cells includes UV windows.

22. A laser system as defined in claim 21 wherein each gain cell has a pair of opposing UV windows.

23. A laser system as defined in claim 18 further including means to minimize parasitic oscillations.

24. A laser system as defined in claim 23 wherein said means includes a fence placed upon said UV windows and the internal walls of said gain cells are made rough.

25. A laser system as defined in claim 1 wherein said laser resonator is either unstable or stable.

26. A laser system as defined in claim 25 wherein said resonator is an unstable confocal resonator.

27. A laser system as defined in claim 26 wherein said resonator operates on a positive branch.

28. A laser system as defined in claim 25 wherein said resonator outputs a laser beam by transmissive coupling.

29. A laser system as defined in claim 1 wherein said resonator is an unstable, confocal resonator with a magnification of about 3, further including a p-polarization flat means therein.

30. A laser system as defined in claim 1 wherein a laser beam output by said resonator is 1.5 diffraction limited, 100:1 polarization extinction, collimated, and has a coherence length greater than 45 meters.

31. A laser system as defined in claim 1 wherein said UV radiation is pulsed into said transverse gain cell at a rate of at least 1 to 300 Hz.

* * * * *